United States Patent [19]

Bennett et al.

[11] 3,814,343

[45] June 4, 1974

[54] AUTOMATIC TAPE LOADING APPARATUS FOR CASSETTES AND THE LIKE

[75] Inventors: William P. Bennett; Jacob Haller, both of Northbrook, Ill.

[73] Assignee: Programming Technologies, Inc., Chicago, Ill.

[22] Filed: Oct. 10, 1972

[21] Appl. No.: 296,255

[52] U.S. Cl. .................. 242/56 R, 226/95, 242/181
[51] Int. Cl. ........................................... B65h 19/20
[58] Field of Search ..................... 242/56 R, 181, 64

[56] References Cited

UNITED STATES PATENTS

| | | | |
|---|---|---|---|
| 3,484,055 | 12/1969 | Raine | 242/181 |
| 3,593,944 | 7/1971 | Umeda et al. | 242/181 |
| 3,620,385 | 11/1971 | Emmasingel et al. | 242/181 X |
| 3,637,153 | 1/1972 | King | 242/56 R |
| 3,667,624 | 6/1972 | Ugura et al. | 242/181 X |
| 3,677,505 | 7/1972 | Taylor | 242/56 R |
| 3,677,555 | 7/1972 | Vail et al. | 242/181 X |
| 3,693,900 | 9/1972 | Bohn | 242/56 R |
| 3,717,314 | 2/1973 | King | 242/56 R X |
| 3,737,358 | 6/1973 | King | 242/56 R |
| 3,753,834 | 8/1973 | King | 242/56 R X |

*Primary Examiner*—John W. Huckert
*Assistant Examiner*—Milton S. Gerstein
*Attorney, Agent, or Firm*—Lawrence S. Lawrence

[57] ABSTRACT

An apparatus is provided for automatically loading a plurality of cassettes of the type having two rotatable spools and a leader tape connecting said spools with a predetermined length of magnetic tape or the like from a supply reel. The apparatus includes a magazine for storing a plurality of empty cassettes, means for advancing said cassettes, one at a time, from the magazine to a loading station, means for withdrawing the leader from the cassette, cutting it into two sections, and splicing the free end of one section to the leading end of a length of supply tape, means for automatically rotating one of the spools of said cassette to wind the spliced leader section and a predetermined length of said supply tape into said cassette, and means for cutting the supply tape after said predetermined amount has been wound into the cassette and splicing the trailing end thereof to the free end of the other leader section. Means are also provided to eject the fully loaded cassette from the apparatus and recommence the tape loading cycle with the following cassette stored in the magazine.

46 Claims, 19 Drawing Figures

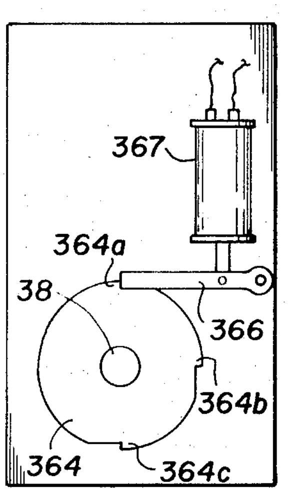
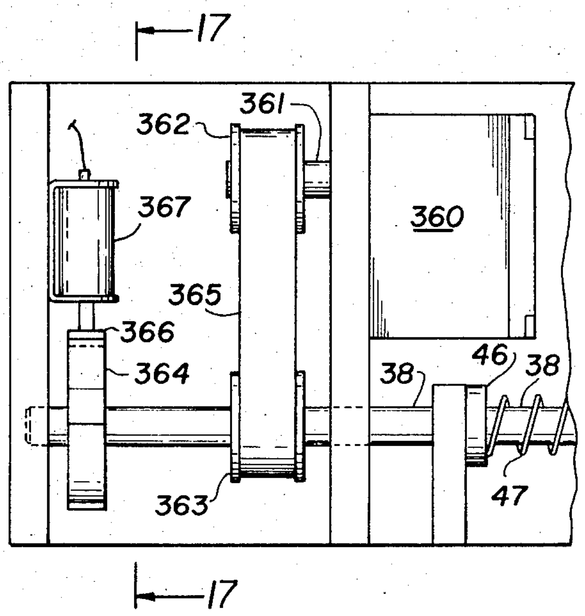
FIG. 17 FIG. 16
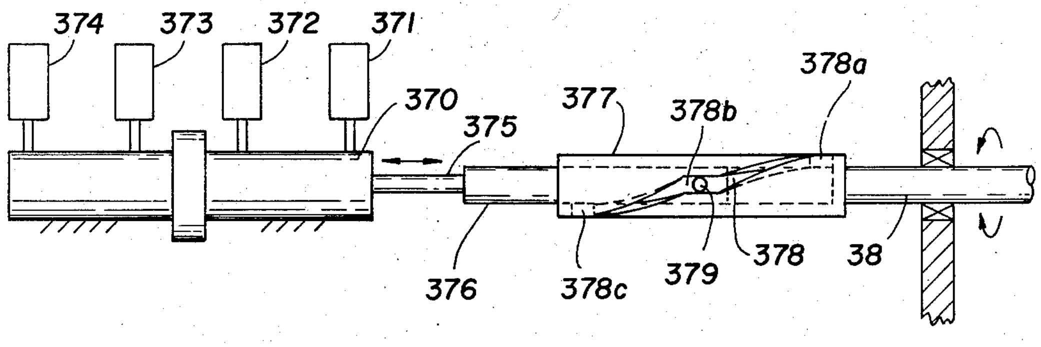
FIG. 18

AUTOMATIC TAPE LOADING APPARATUS FOR CASSETTES AND THE LIKE

BACKGROUND OF THE INVENTION

In recent years magnetic tape cassettes have become an extremely popular means for storing and playing recorded material of both the entertainment and educational type. However, this has increased the existing problem of efficiently and economically loading each cassette with recorded material and supplying the same to the consumer at a resonable price. Conventional magnetic tape cassettes comprise a case having two rotatable spools disposed therein and one or more open sections disposed along one edge of the case through which the tape stored on the spools may be engaged by the transducer head of a playback or recording device. Naturally, cassettes of this type can be loaded with tape prior to the assembly of the case simply by installing in the first instance spools having the desired amount of tape coiled thereon. However, this loading technique has proven to be quite uneconomical due to the complex equipment required to carefully wind the spools and close the cases without damaging the tape. Accordingly, cassette manufacturers have provided fully assembled cassettes with a leader tape having its ends connected to the two spools within the cassette. Cassettes of this type are shown in U.S. Pat. Nos. 3,423,038 and 3,167,267.

Starting with this basic cassette, the loading procedure is quite apparent. First the leader is withdrawn and cut into two discreet sections, one attached to each spool of the cassette. The leading end of the magnetic tape to be loaded is then spliced to one of the leader sections, and the spool for that section is rotated until a predetermined amount of tape has been wound thereon. The tape is then cut and the trailing end thereof spliced to the other leader section to complete the loading operation. To implement the foregoing loading procedure various types of machines for cutting, splicing and winding the tape into cassettes have been developed. Many of these machines are simply holding, cutting and winding jigs that require complete manual implementation. Others are semi-automatic and as such are obviously more desirable.

Typical of the semi-automatic machine is the device shown in U.S. Pat. No. 3,637,153 to King. King discloses a machine which comprises means for rotatably supporting a reel of supply tape, means for holding a blank cassette and rotating the spools thereof, and cutting and splicing means for cutting the leader tape into two sections, splicing the end of one section to the leading end of the supply tape, cutting the supply tape after a predetermined amount thereof has been rotated into the cassette and splicing the end of the other leader section to the trailing end of the supply tape.

Unfortunately, while many of the operations of the King cassette winding apparatus are automatic, the use of this device is still quite time consuming and costly. Each cassette must be manually loaded into the holding means by the operator, and the leader tape must be manually withdrawn from the cassette and placed upon the cutting and splicing means before the automatic operations of the machine can be commenced. Similarly, after the cassette is fully loaded with the supply tape it must also be manual removed from the holding means by the operator. Thus, although King does indeed automate the cutting, splicing and winding operations, the King device can at most be classified as only being semi-automatic, since its automatc capabilities are limited to the handling of a single cassette at a time, and it must depend upon an operator to supply and remove such single cassettes to and from the holding means.

SUMMARY OF THE INVENTION

In accordance with the present invention, an apparatus for automatically loading a plurality of cassettes of the type describded with precorded or blank magnetic tape or the like from a supply source is provided, Unlike the cassette winding devices heretofore employed, the present apparatus is fully automatic; the only manual steps required by the operator being to load a plurality of empty cassettes into a magazine or hopper, install a reel of supply tape and splicing tape, thread the supply tape and splicing tape into the machine and activate the start control. Each cassette is then automatically fed frmom the magazine to a loading station where the leader is automatically extracted, the cassette is loaded with a predetermined amount of the supply tape, and is then automatically ejected from the machine, all without the assistance of an operator. The entire feeding, loading and ejecting operation is fully automatic; as the loading of each cassette with the supply tape is completed, it is ejected from the machine and the next empty cassette is transported into the loading position. The only limitation on the number of cassettes that can be automatically filled with magnetic tape by the instant machine is the size of the supply reel and the capacity of the cassette storage magazine. Accordingly, the operator of the machine must merely monitor the supply of cassettes and the supply of tape and replenish the same as required in order to maintain the machine in operation and minimize its downtime. Due to its fully automatic nature, the machine is capable of operating at a much higher rate of speed than prior winding devices, and thus results in lower cost cassettes. In addition, there is further labor saving inasmuch as a single operator can monitor several machines, whereas in the past a single operator was required for each individual machine in order to implement the many manual operations that were necessary to load each cassette.

In general, the automatic cassette loading apparatus of the invention comprises, in combination, a magazine for storing a supply of empty cassettes to be loaded; cassette receiving means adapted to removably receive one cassette at a time from the magazine and hold the same in a tape loading position; feed means for transporting each cassette from said magazine to said cassette receiving means; a spindle for rotatably supporting a reel of supply tape; a splicing block comprising a first section having a first guide means in its top surface for receiving a length of leader or supply tape, and a second section disposed adjacent the first section having second and third guide means in the top surface thereof, each for receiving a length of leader or supply tape, at least one of said sections being movable between a first position in which the first guide means is in alignment with the second guide means, and a second position in which the first guide is in alignment with the third guide means; means for withdrawing the leader from a cassette in the loading position; means for positioning the leader in the first and second guide means of the splicing block in its first position; means for cutting the tape positioned on the splicing block, movable between a first cutting position in the first position of the splicing block to cut the leader tape into two sections, and a second cutting position in the second position of the splicing block to cut the supply tape after a predetermined amount thereof has been wound into the cassette; splicing means disposed adjacent said splicing block to splice the end of one leader section to the leading end of the supply tape in the second position of the splicing block and to splice the trailing end of the supply tape to the end of the second leader section in the first position of the splicing block; rotatable drive means adapted to removably engage at least one spool of a cassette in the loading position to wind the supply tape into said cassette after the same has been spliced to said leader; sensing means to measure the amount of supply tape being wound into the cassette, and to deactivate the drive means when a predetermined amount of said tape has been so wound; means for ejecting a cassette from the cassette receiving means after it has been fully loaded with supply tape; and control means adapted to sequentially and cyclically activate and deactivate each of the foregoing elements of the apparatus to effectuate the continuous loading of a plurality of cassettes.

It will be apparent to those skilled in the art that many different types of structures and embodiments fall within the definition of the various components of the automatic winding apparatus of the invention specified above. It is critical, however, that such components be seleted bearing in mind the high degree of cooperation required to effectuate the successful operation of the device.

The magazine for storing the supply of cassettes can be in the form of a vertically disposed rectangular cross-section hopper, in which the cassettes are disposed in a horizontal plane and stacked one on top of the other. This type of magazine lends itself quite readily to gravity feeding of the cassettes to the bottom thereof, at which point a discharge opening can be located for the passage of the cassettes to the receiving means. A fully open bottom end or a slot in a side wall of the magazine can be provided for such discharge depending upon the type of feed means utilized. Similarly, a rectangular magazine of this type can also be disposed horizontally and a biasing means, such as a spring, utilized to urge the cassettes toward one end. However, this is less desirable than the vertically disposed magazine due to the extra cost of the biasing means and the restriction that the biasing means must necessarily place on the operator's access to the loading end of the magazine.

The magazine can also be in the form of a rotating or vibrating drum-like hopper in which the cassettes are gradually urged toward an opening located in a lower portion thereof. The complexities of such a hopper, however, render it less satisfactory than the gravity feed rectangular hopper.

The construction of the cassette receiving means for holding the cassettes in the loading position depends to a great extent on the corresponding construction of the magazine and the type of means utilized for feeding the cassettes from the magazine to the receiving means. Consideration should also be given to the fact that the receiving means must cooperate with the means for ejecting the cassettes from the winding apparatus upon the completion of each loading cycle.

The receiving means must be so designed that it properly secures each cassette in the loading position throughout the tape loading operation. To accomplish this, the receiving means can comprise a flat plate having several upstanding pins adapted to engage corresponding openings in the cassette, and one or more clamps which engage one surface of the cassette to hold it firmly in place against the plate. As a preferred alternative embodiment, to simplify the feeding operation as hereinafter described, the cassette receiving means comprises a pair of parallel spaced apart plates rigidly secured to each other along one or more edges and having at least one open edge adapted to receive each cassette inserted therein. Abuttments attached to and interposed between the plates can be provided for aligning the cassettes within the receiving means. In addition, to firmly secure each cassette in the proper position after insertion between the plates, biasing means, such as one or more spring clips, can be provided to urge the cassette firmly against one of the two plates.

To accomplish cassette insertion, the feed means can be simply a pneumatic or hydraulic cylinder having a piston which engages the trailing edge of the lower most cassette in the magazine and forces the same into the cassette receiving means via the magazine discharge opening upon actuation thereof. A motor driven pusher similar to the pneumatic piston or a conveyor having fingers which grasp the cassette in the magazine and force the same to the receiving means can also be utilized. In the case of a conveyor, however, it is preferable that the discharge opening of the magazine be the entire bottom, so that the cassettes can simply drop onto the feed means.

The cassette receiving means must either be permanently fixed or movable into a cassette inserting position, in which the insert opening of the receiving means is in alignment with the discharge opening of the magazine during the cassette feeding operation. Therefore, in order to receive cassettes being fed from a vertical magazine having a horizontal discharge slot, the cassette receiving means must be positioned in a horizontal plane. However, it is preferable that loading of a cassette take place with the cassette positioned in a vertical plane, so that the winding apparatus can be designed as a vertical format structure, rather than a horizontal format structure, and thus take up less floor space. Accordingly, in the preferred embodiment the cassette receiving means is movable from a horizontal cassette inserting position to a vertical cassette loading position, and to accomplish this operation positioning means are provided to rotate the receiving means at least 90° about a horizontal axis. The positioning means comprises a uni-or bi-directional drive means, such as an electric motor or pneumatic cylinder and suitable connecting linkage between the drive means and the receiving means, such as a Geneva drive or a solenoid operated clutch in the case of an electric motor, and a cylindrical tube connected to the horizontal axis of the receiving means and having an elongated circumferential slot adapted to receive and guide therein a radially disposed pin on a piston rod which slidably engages the interior of the tube. The cassette, of course, must be held in the loading position with its open edge adjacent the means for withdrawing and positioning the leader. Therefore, the direction in which the receiving means must be rotated to move from the inserting position to the loading position depends upon the position of each cassette in the magazine. The positioning means can be provided with a single cassette receiving position. However, this requires that the magazine be loaded with the open edges of all cassettes stored therein facing in the same direction to effectuate their proper insertion. This arrangement simplifies the positioning means, since the receiving means need only be rotated 90 degrees in the same direction from the inserting position to the loading position for each loading cycle. But, it also increases the time required to fill the magazine. Thus, it is preferable to provide means which permit the magazine to be randomly filled without regard to the position of the open edge of the cassette.

Accordingly, as another feature of the present invention, means are provided to sense the position of the lowermost cassette in the magazine and sequentially energize the positioning means to rotate the receiving means in the proper direction to receive such cassette, and then rotate the receiving means in the proper direction to place the cassette in the loading position. Standard cassettes are formed with a raised portion on their top and bottom surfaces located adjacent the open edge. The sensing means can be a microswitch mounted at the bottom of the magazine and adapted to be actuated by such raised portion, when the cassette is facing one direction and not activated when the cassette is facing the opposite direction. Upon actuation, the microswitch sends a signal to the bi-directional drive motor to rotate the positioning means in the required direction to place the receiving means in the proper inserting position to accept the next cassette in the magazine. After insertion of the cassette the positioning means is again activated to rotate the receiving means into the loading position.

The means for withdrawing the leader from the cassette and positioning the withdrawn leader on the splicing block includes two separate, but interrelated, devices. The first device for initially withdrawing the leader from the cassette comprises a thin tube having a nozzle at one end adapted to be inserted into a locating opening in the cassette and to direct a stream of high pressure air against the inner surface of the leader tape to force the same out of the open edge of the cassette. The second device for positioning the leader tape on the splicing block is disposed below the cassette receiving means and comprises an elongated housing having a rectangularly shaped vacuum plenum or chamber formed therein. The plenum has an open bottom face and communicators with an access opening located at a midpoint of the housing in the top surface thereof through which it receives the leader tape extracted by the air nozzle. The splicing block is reciprocally movable in a vertical direction between a tape leader receiving position in which it abuts the bottom face of the elongated housing to sealably enclose the vacuum plenum, and a cutting and splicing position in which it is vertically spaced apart from the elongated member to permit cutting and splicing of the tape. Means are also provided to apply a suction force to the ends of the vacuum plenum to cause the tape leader to be formed into a loop corresponding to the internal shape of the plenum, and thereby placed within the guide means of the splicing block.

The first guide means in the first section of the splicing block can be in the form of a elongated groove having a width slightly larger than the width of the supply tape and leader tape to receive and hold such tape therein. Similarly, the second and third guide means in the second splicing block section comprises two parallel elongated grooves, which are selectively alignable with the groove in the first section to define the two splicing block positions. Vacuum connections are provided in the splicing block to hold the leader tape and supply tape in the guide means during the cutting and splicing operations. The suction force also assists in positioning the leader tape on the splicing block during the withdrawing and positioning operations, and, in addition, holds the leader tape in place while the splicing block is vertically moved away from the vacuum plenum into its cutting and splicing position.

Either the first or second splicing block section can be made reciprocally movable to effectuate selective alignment of their respective guide grooves in the first and second positions thereof. Such movement can be automatically effectuated by utilizing any suitable motive means, such as a pneumatic or hydraulic cylinder or electric motor or solenoid. It should be noted that upon withdrawal of the leader tape from a cassette it is automatically placed and held within the first groove of the first splicing block section and the second groove of the second splicing block section which are in alignment to define the first position of the splicing block, and in such position the leading end of the supply tape is held within the third groove of the second splicing block section. After the leader is severed by the cutting means, the splicing block is shifted to its second position to place the cut leader portion held in the first splicing block section and the supply tape held in the third groove of the second splicing block section in alignment for splicing. The remaining cut leader portion is held in place within the second groove of the second splicing block section during the winding operation, and is thereafter shifted back into the first position in alignment with the single groove of the first splicing block section after winding and cutting of the supply tape has been completed.

The first and second splicing block sections define therebetween a gap which permits passage of the cutting means to sever the leader tape in the first position of the splicing block and to sever the supply tape in the second position of the splicing block. Any suitable cutting means, such as a knife or a shear can be utilized in the apparatus of the invention. However, in the preferred embodiment, the cutting means comprises an electrical resistance type heating element, which rapidly severs the leader tape and the supply tape, as well as the required adhesive splicing tape, as hereinafter discussed, by rapidly burning such tapes along an extremely narrow line. The cutting element can be simply a high resistance wire formed of tungsten or a similar material connected to a voltage source of suitable potential. To implement the cutting operation, the wire, which is hereinafter referred to as the "hot wire" can be mounted on a pivotally movable lever arm, or a vertically movable bracket, which is adapted to raise and lower the hot wire between a position below the surface of the splicing block to a position above the surface of the splicing block by passing through the gap between the two splicing block sections. The hot wire has an advantage over conventional cutting means inasmuch as it permits the cutting operation to be accomplished during both the upward and downward stroke of the lever arm or bracket. In addition, the thinness of the hot wire permits the gap between the splicing block sections to be made relatively small, so that the tape held thereon is properly supported.

The splicing means is adapted to apply a section of adhesive splicing tape to the abutting ends of the leader tape and the supply tape held on the first and second splicing block sections in both their first and second positions. The splicing means includes a hub for supporting a role of splicing tape, a splicing head and reciprocally movable feed means for incrementally advancing the splicing tape from the supply role to the splicing head. The splicing head is disposed for reciprocal vertical movement above the splicing block, and is adapted to receive a section of splicing tape from the feed means and apply the same under pressure to the tape to be spliced. In the preferred embodiment, the portion of the splicing tape feed means that holds the splicing tape comprises a block having a tape guide groove formed in its lower surface. Suitable vacuum lines are connected to the groove to hold the splicing tape therein by means of suction. In operation, the splicing tape is picked up by the suction force of the feed means block. The block is then horizontally advanced to the splicing head by any suitable transport means, such as the pneumatic cylinder. The splicing head then picks up the leading end of the splicing tape, also by applying suction, the suction to the feed is stopped, and the feed means block returned to its tape pick-up position where it receives and holds the next section of splicing tape by suction. At that point the splicing tape is cut.

The position of the splicing means with respect to the splicing block and the cutting means is such that the movement of the hot wire upwardly cuts the tape on the splicing block as well as the splicing tape held in the splicing means. Likewise downward movement of the hot wire also cuts the splicing tape and the magnetic tape positioned on the splicing block. It should also be noted that in the preferred embodiment the entire splicing means including the splicing tape, feed means and splicing head are movable laterally away from the splicing block to permit the splicing block to be moved into sealing engagement with the vacuum plenum to receive the leader from the next cassette. Further details of the construction and operation of the splicing means are described hereinafter with respect to the drawing.

The rotatable drive means for the take-up spool of a cassette comprises a drive motor having a stub axle adapted to operatively engage the spool. The drive motor can be of any suitable type that is readily controlled such as an electric motor or a pneumatic turbine. The drive motor is mounted on a transport means, such as a slidable support bracket, which is reciprocally movable by means of a pneumatic or hydraulic cylinder between a drive position in which the stub axle engages the spool of a cassette held in the loading position by the receiving means and a neutral position in which the stub axle is out of engagement with the cassette. In addition, it is convenient to also mount the tubular nozzle for withdrawing the tape leader on the transport means. To accomplish tape withdrawal, the transport means can be provided with a third position located between the drive position and the neutral position, in which the tube engages the cassette with the nozzle placed adjacent the leader tape.

The means for sensing the amount of supply tape to be loaded onto each cassette can be one or more magnetic tape transducers positioned to pick up a signal inaudible at normal play back speed, recorded on the tape at the end of each tape segment. In addition, a mechanical counting means to measure the length of tape actually wound onto each cassette can also be employed, either individually or in combination with the pick-up transducer. The sensing means is adapted to stop the rotatable drive means for the cassette after the desired amount of tape has been wound onto the cassette, and to then actuate the next sequence of operation of the apparatus to complete the splicing and winding cycle for each cassette.

The ejection means for removing a fully loaded cassette from the winding apparatus of the invention can be simply a pneumatically operated pusher arm adapted to forceably urge the loaded cassette out of the cassette receiving means. As in the case of the leader withdrawing tube, it is usually convenient to mount the ejection means on the drive motor transport means. It should be noted that where a rotatable cassette receiving means is utilized, after the cassette is fully loaded the bidirectional motor must be actuated to rotate the receiving means 90° into an eject position, in which the loaded cassette can be discharged from the apparatus.

The control means employed to activate the various components of the winding apparatus of the invention in their proper sequence comprises a series of interconnected stepper switches, micro-switches and solenoids adapted to be actuated by each of the various components as they perform their intended functions. Solid state circuitry or electro-mechanical relays can be employed individually or in combination to perform the control function, and such circuitry will be well known to those skilled in the art.

The foregoing features and components of the cassette loading apparatus of the invention along with additional features thereof are more fully defined in the accompanying drawings.

BRIEF DESCRIPTION OF DRAWINGS

FIG. 16 is a side view of an alternate embodiment of the cassette indexing means.

FIG. 17 is a view taken along line 17—17 of FIG. 16.

FIG. 18 is a side view of still another embodiment of the cassette indexing means.

DESCRIPTION OF THE PREFERRED EMBODIMENTS

Figure 1:
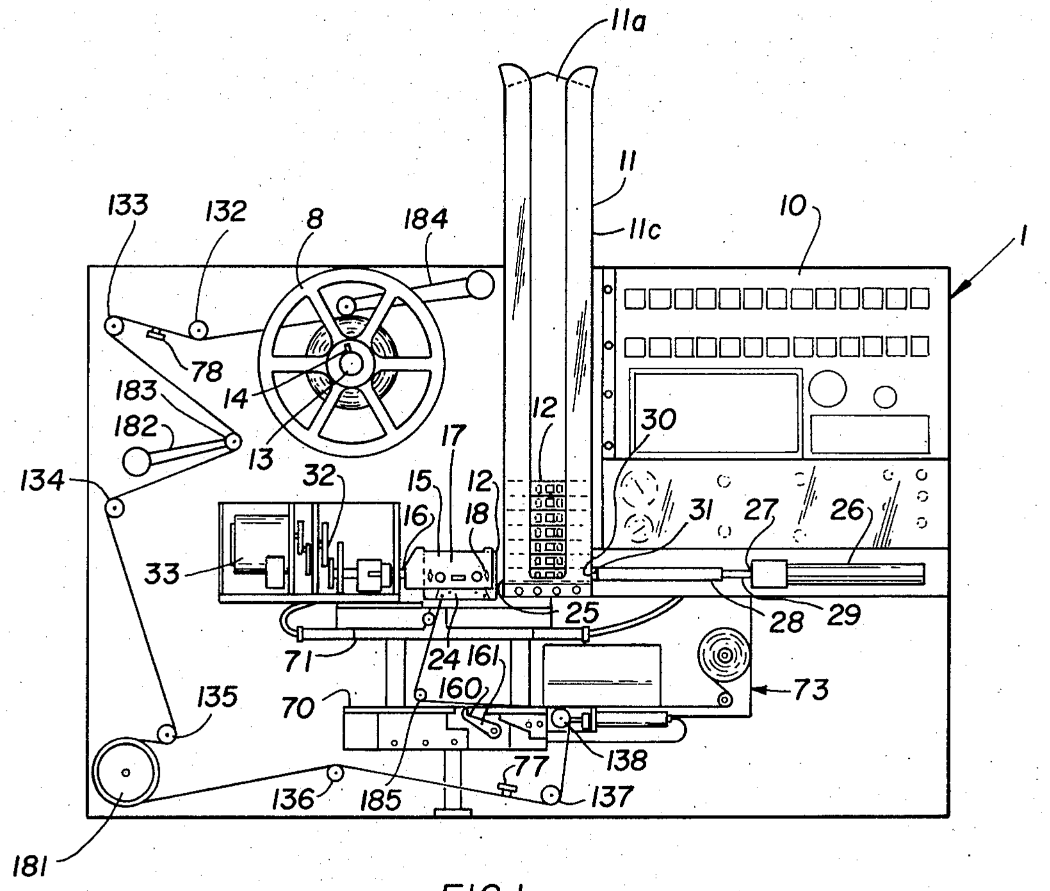
FIG. 1 is a front elevational view of the cassette winding apparatus of the invention.
Figure 3:
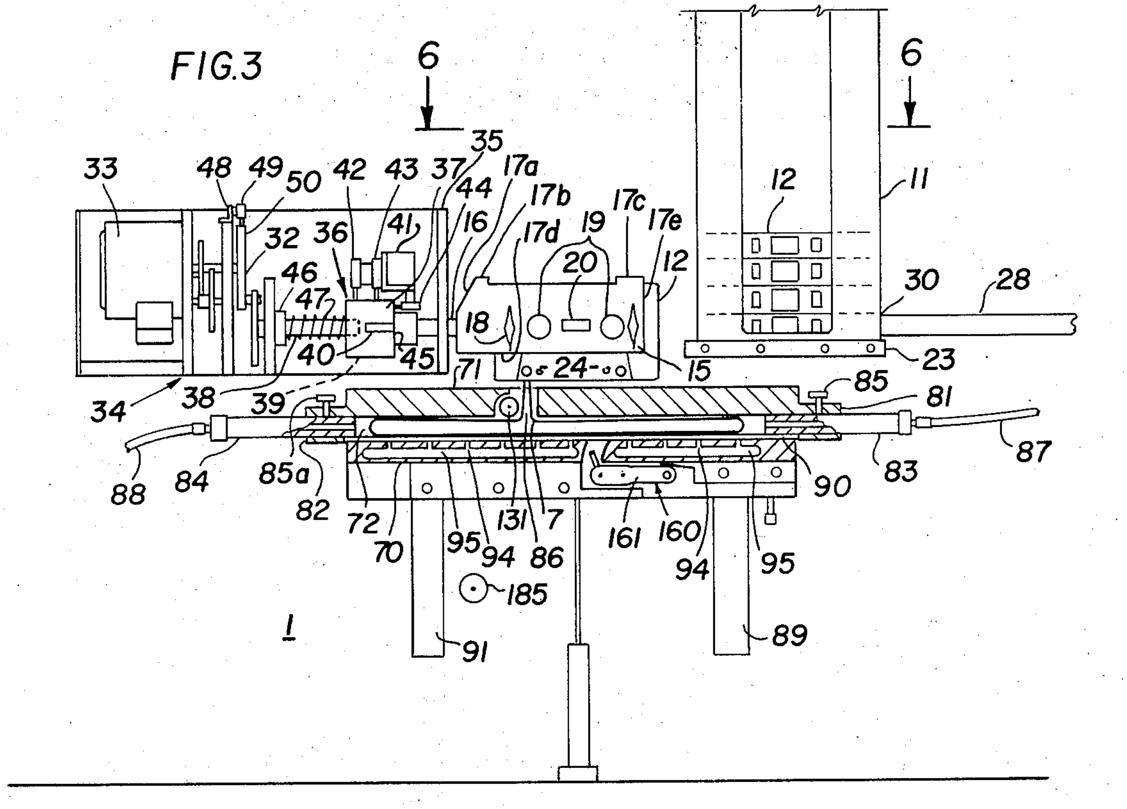
FIG. 3 is an enlargement of one portion of the winding apparatus of FIG. 1 shown partially in cross section.
Figure 7:
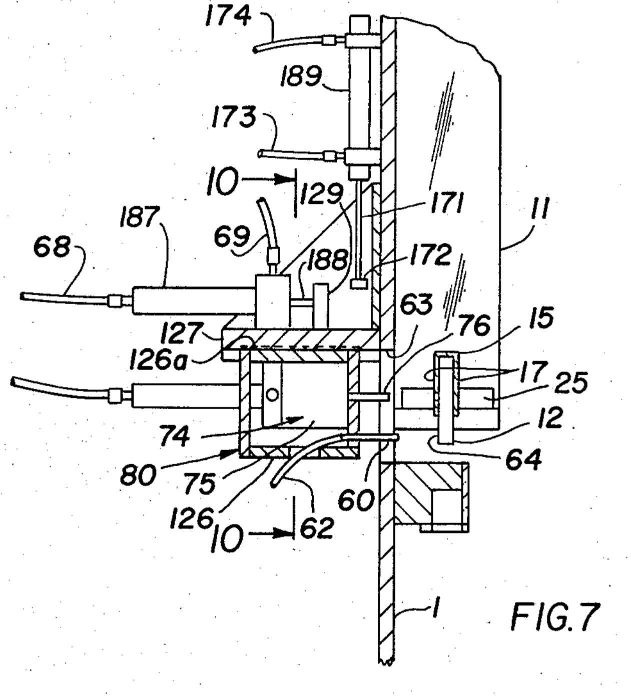
FIG. 7 is a cross-sectional view taken along the line 7—7 of FIG. 6.

As shown in FIGS. 1, 3 and 7, the apparatus for automatically loading a plurality of cassettes in accordance with the invention comprises a console having a mounting panel 1 which supports thereon a control panel 10; a spindle 13 for rotatably supporting a reel 8 of magnetic tape 3; a rectangular cross-section magazine 11 for holding a plurality of empty cassettes 12 to be loaded with a predetermined amount of magnetic tape; cassette receiving means 15 is disposed adjacent one side of the magazine to receive one cassette at a time from the magazine and hold the same in a tape loading position; and cassette feed means 26 disposed on the opposite side of the magazine 11 for transporting each cassette from the magazine to the receiving means 15. A splicing block 70 disposed below the cassette receiving means is provided for supporting a section of magnetic tape 3 and leader tape 7 (FIG. 4) thereon; and means for positioning the leader tape 7 on the splicing block 70, comprising an elongated leader guide housing 71 is mounted above the splicing block, Cutting means 160 having a pivotally movable lever 161 is mounted on splicing block 70 to selectively sever the leader tape and the supply tape positioned on the splicing block. A splicing assembly 73 is movably disposed adjacent the splicing block to splice the severed leader 7 to the magnetic tape 3. The apparatus also comprises cassette drive means 74 (FIG. 7) comprising an electric motor 75 and a rotatable stub axle 76 to rotate a take-up spool 4 of cassette 12 to wind magnetic tape 3 thereon; and transducers 77 and 78 to pick up an inaudible signal recorded on tape 3 to sense the amount of tape being wound into the cassette, and to deactivate drive motor 75 in response thereto.

Figure 2:
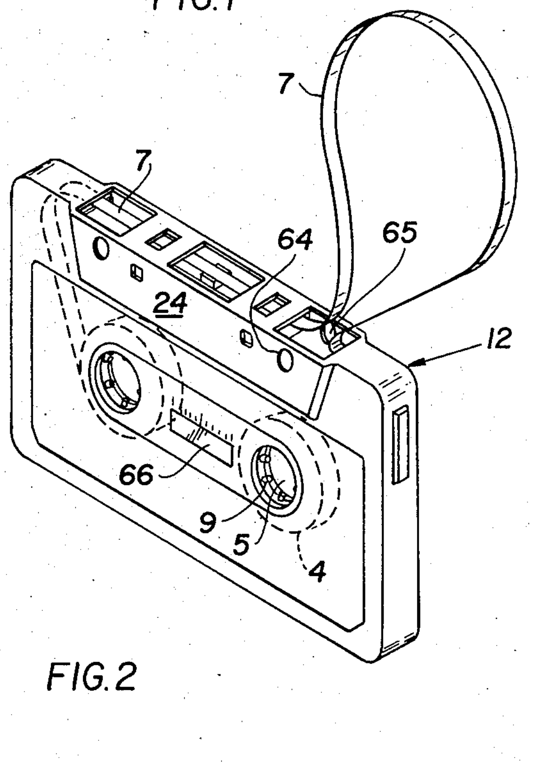
FIG. 2 is a perspective view of a typical magnetic tape cassette used in the present invention.

Referring to FIG. 2, the cassettes 12 are of a conventional type comprising a case 2, two spools 4 and 6 rotatably mounted within the case, and a leader tape 7 having the opposite ends thereof secured to spools 4 and 6. The leader tape 7 is of sufficient length so that it may be withdrawn via opening 65 formed along one edge of case 2 for splicing to the leading end of the magnetic tape 3 to be loaded into the cassette as hereinafter described. Spool 4 has an aperture 5 to accommodate the rotatable stub axle 76 of the drive means 74 and internal teeth 9 which are operatively engaged by said stub axle to effectuate rotational movement of said spool to wind tape 3 thereon. The cassette also has a locating aperture 64 formed adjacent opening 65 on the front and rear faces of case 2, a raised portion 24 formed on both faces adjacent the edge containing opening 65, and a window 66 to visually observe the tape therein.

The supply reel 8 containing magnetic tape 3 is removably mounted on spindle 13 for rotational movement therewith by means of a pivotally movable bracket arm 14 attached to the end of spindle 13 and adapted to engage a corresponding keyway in the hub of reel 8. Other suitable means, such as a fixed longitudinal rib on the spindle adapted to engage the keyway of the reel, and a hub cap which threadably engages the end of the spindle can also be utilized to secure the reel in place for rotation with the spindle. Spindle 13 extends through plate 1 and is in operative engagement with a tensioning motor or a friction brake adapted to apply a reverse torque thereto to prevent runoff or backlash of the tape 3 in the event that the tape should break, and to serve as a brake to stop the flow of tape after the desired amount has been loaded into a cassette or the apparatus is stopped. The tensioning motor (not shown) can be an electric motor or an pneumatically driven turbine. In the case of a friction brake, an electromagnetic or pneumatically operated disc, shoe or the like can be provided. The spindle 13 can be stopped, or the linkage between the tensioning means or brake and spindle 13 can be adapted to slip when the winding force of drive means 74 is applied to spool 4 of cassette 12 to permit tape 3 to be withdrawn from reel 8.

Figure 8:
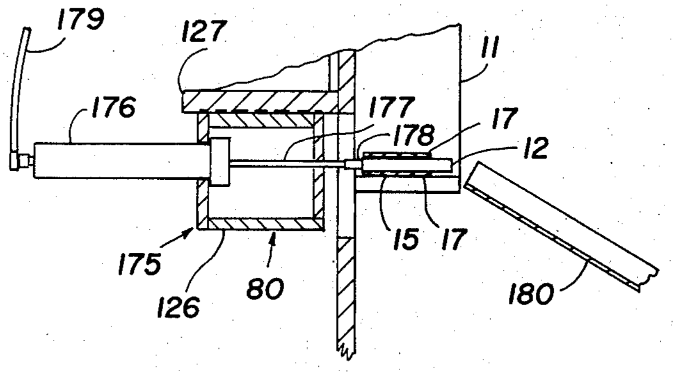
FIG. 8 is a cross-sectional view of one portion of the apparatus shown in FIG. 7.

The cassette receiving means 15 (hereinafter referred to as "receiver") is fixably mounted on the end of a rotatable shaft 16 which, as more fully described hereinafter, rotates the receiver between a vertical tape loading position as shown in FIG. 1 in which opening 65 of a cassette held therein is downwardly disposed, and a horizontal cassette receiving and ejecting position as shown in FIG. 8. The cassette receiver comprises a pair of spaced apart parallel plates 17 rigidly secured to each other along edges 17*a*, 17*b* and 17*c* and defining therebetween a generally rectangular shaped sleeve open along edges 17*d* and 17*e* to receive and hold each cassette 12 as it is fed from magazine 11. A pair of spring clips 18 are mounted on the exterior of receiver 15 and have tab portions (not shown) which extend through suitable openings in plates 17 to engage case 2 of each cassette and thereby hold the same in a fixed position during the tape splicing and loading operations. Circular openings 19 are formed in both plates 17 of the receiver 15 in alignment with the apertures 5 of each spool of a cassette disposed therein to permit engagement thereof by the stub axle 76 of drive means 74. Also formed in the cassette receiver 15 is a window 20, which corresponds to window 66 of the cassette to permit the operator to visually observe the winding operation within the cassette.

Figure 6:
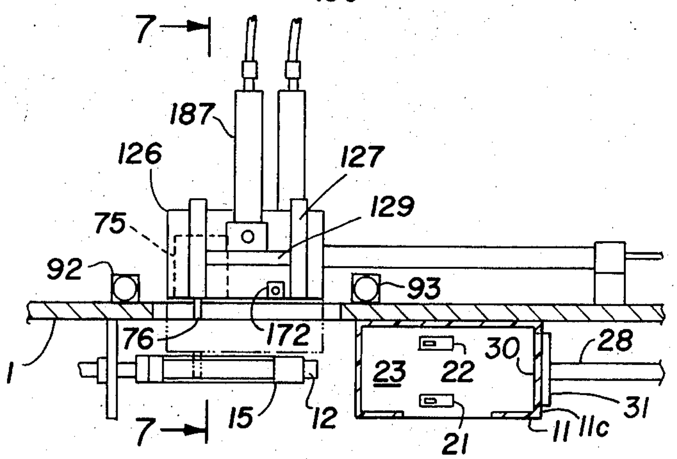
FIG. 6 is a partial cross-sectional view taken along the line 6—6 of FIG. 3.

The magazine 11 has an open top 11a through which the cassettes may be inserted by an operator. The internal rectangular dimensions of the magazine 11 are slightly larger than the outer dimensions of the cassettes so as to guide and permit the cassettes to be stored therein in a vertical stack. Since the cassettes have a uniform rectangular shape, which matches the internal cross-sectional shape of the magazine 11, they may be inserted into the magazine by the operator with the raised portion 24 positioned either adjacent the front or the rear walls of the magazine. As shown in FIG. 6, a pair of microswitches 21 and 22 are mounted on a bottom plate 23 of the magazine 11. Microswitch 21 is adapted to be engaged and actuated by the raised portion 24 of the lowermost cassette in the magazine when such cassette is positioned with its raised portion closest the front, and thereby detects the cassette position. However, when the cassette is facing in the opposite direction with its raised portion closest to the rear wall of the magazine, microswitch 21 remains unactuated. Microswitch 22 is actuated by a cassette positioned in either direction and thus serves to provide a signal when magazine 11 is empty. The actuating arm of microswitch 22 can also be made weight sensitive, so that a signal can be provided when a predetermined number of cassettes remain in the magazine, so that the operator can replenish the supply without stopping the apparatus. In addition it may be desirable to provide a second microswitch to indicate the absence of raised portion 24 to operate in conjunction with microswitch 21, to avoid a malfunction if a cassette should become cocked in the magazine.

The cassettes 12 are transported by feed means 26 from magazine 11 to receiver 15 via a discharge opening 25 formed in the lowermost portion of side wall 11b of magazine 11 located immediately above bottom plate 23 and adjacent to the receiver 15. The feed means 26 comprises a solenoid operated pneumatic cylinder 27 fixably mounted on plate 1 in horizontal alignment with the lowermost cassette 12 in magazine 11. The cylinder 26 has a reciprocally movable piston 29, which fixedly carries a pusher rod 28 and a pusher tip 31 adapted to engage the trailing edge of the lowermost cassette in the magazine. An opening 30 formed in side wall 11*c* of magazine 11 permits entry of pusher rod 28 and pusher tip 31 upon actuation of cylinder 26. As shown in FIG. 6, pusher tip 31 extends parallel to the trailing edge of each cassette and engages each cassette over a relatively large area to provide a uniform feeding force to insure proper insertion of the cassette into receiver 15. The thickness of pusher tip 31 and of rod 28 is preferrably less than the thickness of each cassette 12, so that the feed means may be reciprocated without the danger of the pusher rod or the pusher tip catching on the next cassette above the cassette being inserted into the receiver.

As mentioned above, receiver 15 is shown in FIG. 1 in the loading position, in which position the leader 7 may be extracted and the supply tape inserted into a cassette 12. In the loading position the receiver is 90° out of phase with the orientation of the cassettes stored within magazine 11. Accordingly, in order to feed the lowermost cassette from the magazine to the receiver, the receiver must first be rotated 90 degrees into a cassette receiving position. The shape of the receiver 15 is such that cassettes can only be inserted therein with their raised portion 24 extending to the exterior of parallel plates 17. Accordingly, the direction in which receiver 15 must be rotated to accomodate the next cassette from magazine 11 depends upon the position of that cassette within the magazine. This information is provided by the actuation of microswitch 21.

The rotational movement of receiver 15 is accomplished by means of a Geneva drive mechanism 32, which operatively engages shaft 16, and is powered by a bi-directional electric motor 33. A bracket assembly 34 rigidly secures the Geneva mechanism and the drive motor to mounting plate 1. Shaft 16 is journaled within an opening formed in a further mounting bracket 35 and is connected via a rotatable position detecting switch mechanism 36 to the Geneva drive 32. Indexing mechanism 36 operates in conjunction with microswitch 21 to activate the Geneva drive motor 33 for rotation in the proper direction to place receiver 15 into a position to accept the next cassette from the magazine. The Geneva mechanism 32 is adapted to rotate the receiver 15 in increments of 90° each. The design of a Geneva drive mechanism is such that it accurately positions and holds an object being rotated, and as such is well suited for positioning the receiver 15 in the present invention. It should be noted, however, that other rotatable linkages well known to those skilled in the art can also be employed to properly position the receiver.

The rotatable indexing mechanism 36 comprises a cylinder 37 fixably mounted at its center to shaft 16. A further shaft 38 is connected to the Geneva drive mechanism for rotational movement therewith, and is adapted to slidably engage a central opening formed in cylinder 37. A pin or a rib (not shown) engages a keyway in the opening of cylinder 37, so that rotational movement of shaft 38 causes corresponding rotational movement of Cylinder 37.

Shaft 38 has an enlarged flange-like portion 46 disposed adjacent the Geneva drive 32. A helical compression spring 47 is disposed about shaft 38 and bears against enlarged portion 46 and cylinder 37 to biase the cylinder toward receiver 15.

Cylinder 37 is formed with at least two position indicating grooves 39 and 40 which represent the two cassette receiving positions of receiver 15. In addition, it may be desirable to provide a third groove (not shown) to indicate the cassette loading position. An angle bracket 41 fixably mounted on mounting plate 1 and disposed above cylinder 37 carries thereon two microswitches 42 and 43, each having a spring biased actuating arms with suitable rollers, which slidably engage and ride upon the outer surface of cylinder 37, and are adapted to engage grooves 40 and 39 respectively, during rotation of the cylinder. A third microswitch 44 is also mounted on bracket 41 and slidably engages the face 45 of cylinder 37. Spring 47 urges the cylinder into contact with microswitch 44. As the cylinder 37 is rotated, microswitch 43 will in one rotational position engage groove 39 and thereby be activated. Similarly, microswitch 42 will in another rotational position of the cylinder engage groove 40 and likewise be activated. Another angle bracket 48 is mounted on plate 1 above the Geneva drive 32. A microswitch 49, which is secured to bracket 48 engages wheel 50 of the Geneva drive, and is adapted to be activated by either a groove or lobe formed in one radial location on wheel 50 upon the completion of each Geneva drive cycle, and to thereby deactivate drive motor 33 with the receiver located in the cassette loading position.

If we assume that the unloaded receiver is in the position shown in FIGS. 1 and 3, upon energization of the apparatus of the invention, microswitch 21 will provide a signal to indicate the direction in which receiver 15 must be rotated to accept the lowermost cassette in the magazine. In the cassette receiving position, pusher rod 28 of the feed means 26 transports the cassette from the magazine to the receiver. The force applied to the cassette within the receiver by pusher rod 28 causes slight axial movement of shaft 16 and cylinder 37 overcoming the biasing action of spring 47. This temporarily causes disengagement between microswitch 44 and cylinder face 45, thus activating microswitch 44 to initiate the operation of drive motor 33. At this point, microswitches 42 and 43 detect the position of cylinder 37 by their engagement or lack of engagement with grooves 40 and 39 formed in the cylinder, and thus provide a signal to motor 33 to initiate rotational movement in either a forward or reverse direction to transport the receiver into the cassette loading position. Once in the cassette loading position, wheel 50 of the Geneva drive actuates microswitch 49, indicating the completion of the Geneva cycle, and thus deactivates drive motor 33. The operation of these microswitches are more fully described with reference to the control circuit shown in FIG. 1.

FIGS. 16, 17 and 18 illustrate two alternate drive means for rotating the receiver 15 between the cassette inserting position, the loading position and the eject position.

The drive means shown in FIGS. 16 and 17 comprises an electric motor 360 having and output shaft 361 connected to a flanged wheel 362. Shaft 38, which links the indexing mechanism 36 to the drive means, has a second flanged wheel 363 mounted along a midpoint thereof and terminates in a three-position cam wheel 364 having stop lobes **364*a*, 364*b* and 364*c* formed thereon, which correspond, respectively, to the inserting, loading and ejecting positions of the receiver 15. A drive belt 365 operatively connects wheel 362 and wheel 363 to rotate shaft 38 between the desired positions. A pivotally mounted lever 366 is disposed adjacent cam 364 in sliding engagement with the cam surface. As shown in FIG. 17 the lever 366 is adapted to stop the rotational movement of cam 364 each time it engages a stop lobe thereof. A slip clutch (not shown) is associated with wheel 363 to permit continuous operation of motor 360 when the rotational movement of cam 364 and shaft 38** is stopped in the desired position.

To disengage lever 366 from cam 364 a solenoid 367 disposed above the lever and operatively linked thereto is provided. The solenoid is connected by suitable circuitry to microswitches 21, 42, 43 and 44, which energize the solenoid to permit rotational movement of the receiver and de-energize the same to stop the receiver in the desired position.

The drive means shown in FIG. 18 comprises a three-position pneumatic cylinder 370 having four air line connections controlled by solenoids 371, 372, 373, 374. A reciprocally movable output shaft 375 of cylinder 370 is fixedly connected to solid cylindrical rod 376, which rod is adapted to slidably ride within a hollow cylinder 377. The cylinder 377 is connected to one end of shaft 38 for rotating the same between the three positions of the receiver. An elongated circumferential groove 378 having longitudinal sections **378*a*, 378*b* and 378*c*, which correspond, respectively, to the cassette inserting, loading and ejecting positions of receiver 15 is formed in the wall of cylinder 377. A radially disposed pin 379 attached to rod 376 slidably engages groove 378, so that reciprocal movement of rod 376 by means of pneumatic cylinder 370 is translated into rotational movement of cylinder 377 and shaft 38 attached thereto. The air line control solenoids 371, 372, 373 and 374 are connected by suitable circuitry to the microswitches 21, 42, 43 and 44 of the receiver indexing means to activate the appropriate air lines to reciprocally move rod 376** into the desired position.

As shown in FIG. 7, the means provided for withdrawing the tape leader from each cassette comprises a hollow tubular member 60, which is mounted on a transport means 80 for reciprocal horizontal movement at the rear of mounting plate 1 between a leader tape withdrawing position in which the tubular member 60 which is in alignment with alignment opening 64 of cassette 12 and a non-operative position out of such engagement. The structure and operation of transport means 80 is described hereinafter with reference to the spool drive means 74. An air nozzle 61 is downwardly disposed at one end of tubular member 60, so that an air jet discharged therefrom will contact the inner surface of the tape leader to apply a force thereagainst and thereby effectuate its extraction via opening 67 of cassette 12. A pneumatic pressure line 62 is connected to the other end of the tubular member 60 to provide the necessary air pressure. A rectangular shaped opening 63 is formed in plate 1 adjacent receiver 15 to permit passage of the tubular member 60 therethrough. Applying air pressure to tube 60 by means of line 62, after the insertion of the tube into opening 64 of the cassette, the air stream or jet discharged via nozzle 61 causes the tape leader contained within the cassette to be blown outwardly of the cassette in the form of a loop, a portion of which is positioned upon splicing block 70.

Referring once again to FIG. 3, it can be seen that the elongated leader guide housing 71 of the leader tape positioning means has an internal chamber or plenum 72 formed therein. The plenum has a substantially rectangular cross-sectional shape, the width of which is slightly wider than the leader tape to provide guidance therefor, and is fully open along the bottom side. Vacuum ports 81 and 82 are disposed at opposite ends of the housing 71 in communication with plenum 72, and are each adapted to slidably and sealably receive therein length adjustment adaptors 83 and 84, respectively, which are movable to either increase or decrease the internal volume of plenum 72 depending upon the length of the leader tape in the particular lot of cassettes being loaded. A pair of knurled thumb screws 85 and 85a threadably engage the ends of housing 71 adjacent ports 81 and 82, respectively, to manually lock the adjustment adaptors 83 and 84 in the desired position. A leader entrance passage 86 is formed at a midpoint of housing 71 adjacent opening 65 of a cassette 12 held in the loading position to permit the entry into plenum 72 of a loop of leader tape 7 upon its extraction from a cassette. A pivotally retractable guide roller 131 is disposed in passage 86 and is adapted to be automatically moved into an operative tape guiding position during the winding of the supply tape 3 into a cassette. Lines 87 and 88 connect adaptors 83 and 84, respectively, to a vacuum source which evacuates plenum 72 during the leader tape positioning operation to draw the leader loop into a shape which substantially conforms to the internal shape of the plenum. It has been found that the best results are achieved by alternately applying suction to the adaptors 83 and 84, simultaneously with the discharge of an air jet from nozzle 61.

Figure 4:
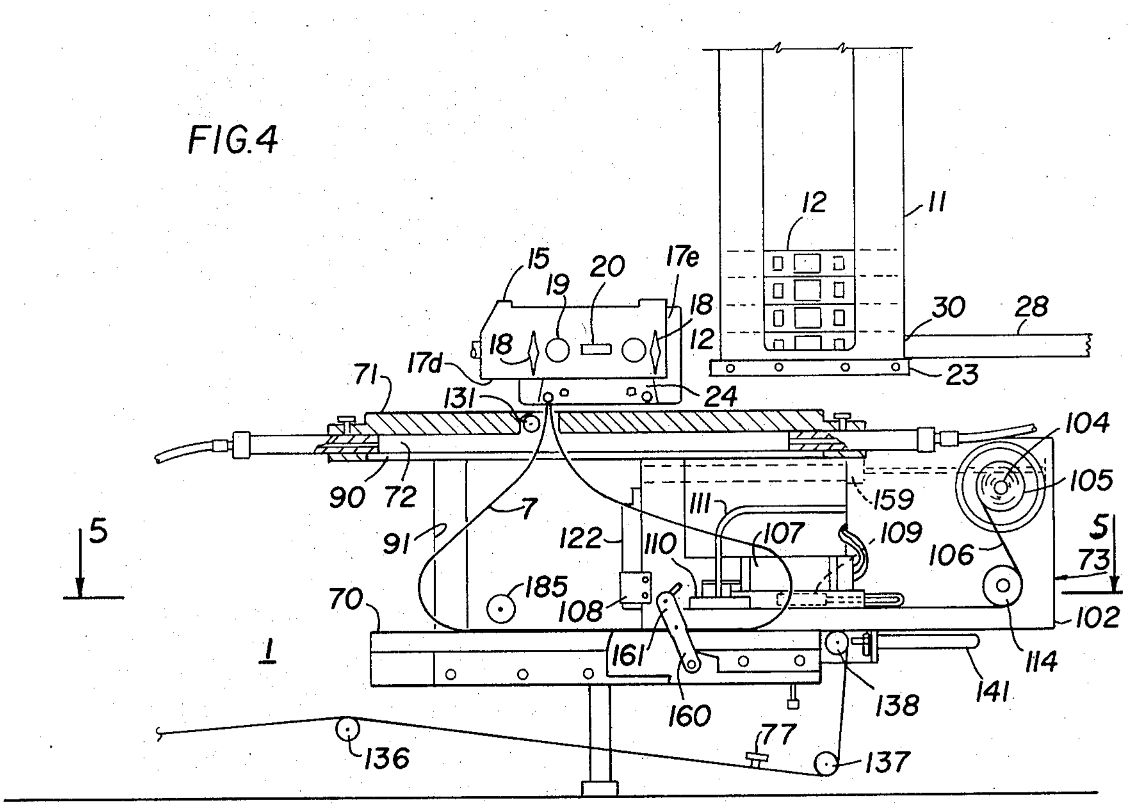
FIG. 4 is an other view of a portion of the machine shown in FIG. 1.
Figure 5:
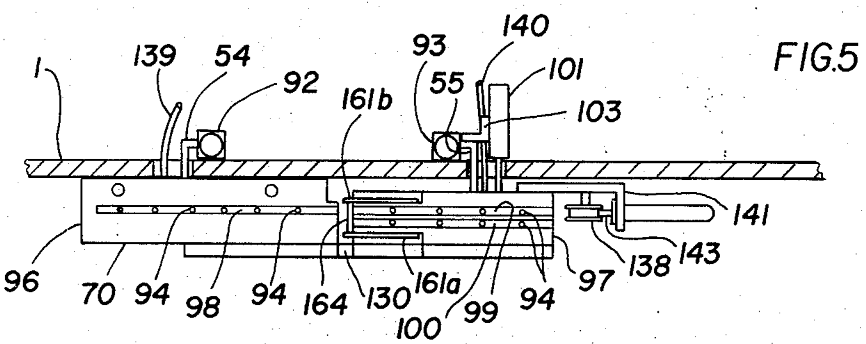
FIG. 5 is a partial cross-sectional view taken along the line 5—5 of FIG. 4 showing the splicing block utilized in the instant invention.

The bottom of plenum 72 is enclosed during the leader tape positioning operation by splicing block 70, which is vertically movable between a leader tape receiving position enclosing the plenum as shown in FIG. 3, and a tape cutting, splicing and winding position spaced from the plenum as shown in FIGS. 1 and 4. The splicing block 70 has a pair of support brackets 54 and 55 which extend through and ride within slotted openings 89 and 91 formed in mounting plate 1. Solenoid operated pneumatic cylinders 92 and 93 are fixedly disposed on the rear of mounting plate 1 as shown in FIGS. 5 and 6 and have their actuating arms attached to support brackets 54 and 55, respectively, to raise and lower the splicing block between the two aforesaid positions. A gasket 90 is attached to housing 71 along the periphery of the open bottom of vacuum plenum 72, so that in the leader tape receiving position, splicing block 70 engages gasket 90 to sealably enclose vacuum plenum 72.

It can be seen in FIG. 5 that splicing block 70 comprises two contiguous splicing block sections 96 and 97, which define a continuous flat splicing surface having a gap 130 therebetween. An elongated tape guide groove 98 formed in splicing block section 96 extends longitudinally therealong and is adapted to receive and hold therein the leader tape during the initial cutting and splicing of the leader to the leading end of the supply tape 3, and the trailing end of the supply tape during the final cutting and splicing operation. Similarly, splicing block section 97 has formed in the surface thereof a pair of tape guide grooves 99 and 100 which are also adapted to receive and hold the leader tape and the supply tape, respectively. It should be noted that the width of each of the guide grooves corresponds to the width of the tape to insure its proper alignment during the cutting and splicing operations. A plurality of apertures 94 are formed in the bottom surface of each guide groove and are connected to a central chamber 95 in each splicing block section. The chambers 95 are connected via lines 139 and 140 shown in FIG. 5 to a vacuum source, which is activated to position and firmly hold the leader tape 7 and the supply tape 3 within the guide grooves by means of suction.

Splicing block section 97 is movable transversely of section 96 to selectively align guide grooves 99 and 100 with guide groove 98 to define two distinct cutting and splicing positions of the splicing block. A solenoid operated pneumatic cylinder 101 attached to bracket 55 by means of angle bracket 103 provides the motive force to shift splicing block section 97 between the two positions. The cylinder 101 can, of course, be fixed to the stationary splicing block section 96. It also should be noted that section 97 can be fixed and section 96 can be made movable. This is a matter of design choice. The first splicing block position is shown in FIG. 5 and is defined by the alignment of grooves 98 and 99. The movable splicing block section is held in this position during the withdrawal and positioning of the leader tape thereon so that grooves 98 and 99 are aligned with vacuum plenum 72 in the vertically raised leader tape receiving position of the splicing block. In addition, the first splicing block position is maintained during the initial cutting of the leader. The second splicing block position is defined by the alignment of grooves 98 and 100, and is utilized to initially splice the cut leader held in groove 98 to the leading end of the supply tape held in groove 100. This position is also maintained to cut the supply tape after a predetermined amount has been wound into the cassette. Thereafter the splicing block is returned to its first position to splice the trailing end of the supply tape held in groove 98 to the remaining leader section held in groove 99.

Prior to initially starting the apparatus of the invention, the supply tape 3 stored on reel 8 is manually threaded over and under a series of guide rollers 132 to 138 shown in FIG. 1, and the leading end thereof is placed within guide groove 100 of splicing block section 97. Suction via line 140 is then applied to hold the tape within the guide grooves during the withdrawal and cutting of the leader tape from the first cassette to be loaded and the splicing thereof to the supply tape. To further secure the supply tape in the proper position upon splicing block section 97 during cutting and splicing, and during the feeding and ejecting of the first and subsequent cassettes to and from receiver 15, a pneumatically operated clamp 141 is mounted on splicing block Section 97 adjacent guide roller 138. The clamp comprises a mounting bracket 142, a solenoid operated pneumatic cylinder 144 secured to the bracket, and a locking arm 143 projecting from the cylinder and adapted upon actuation of cylinder 144 to clamp tape 3 in place on roller 138.

Figures 9, 15:
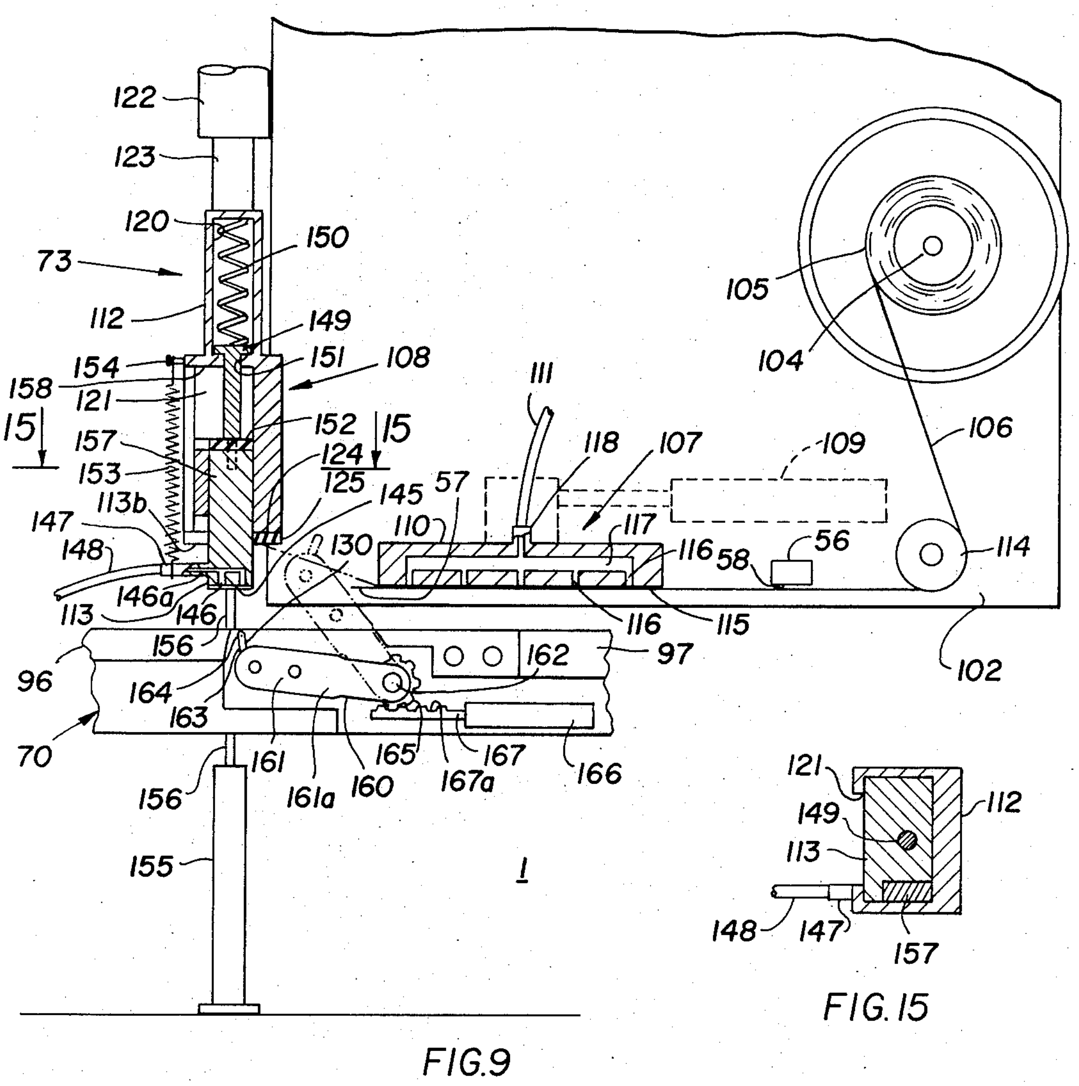
FIG. 9 is a partial cross-sectional view of a portion of the tape splicing assembly and cutting means of the winding apparatus.
FIG. 15 is a cross-sectional view of the splicing head taken along line 15—15 of FIG. 9.

Referring to FIGS. 1, 4 and 9 it can be seen that splicing assembly 73 is mounted between housing 71 and the cutting and splicing position of splicing block 70 for horizontal reciprocal movement upon mounting plate 1. In this manner the splicing assembly 73 can be moved into a non-operative position to avoid interference with splicing block 70 when the splicing block is vertically raised into its leader tape receiving position. The non-operative position of the splicing assembly is shown for illustrious purposes in FIG. 1, but it should be noted that in actual operation when the other components and sub-assemblies of the winding apparatus are in the position shown in FIG. 1, which occurs during the winding of the supply tape 3 into a cassette, the splicing assembly 73 will be in the operative position shown in FIG. 4.

Splicing assembly 73 comprises a transport plate 102 supported on mounting plate 1 and automatically movable between the operative and non-operative positions described above by means of solenoid operated pneumatic cylinder 159 mounted at the rear of plate 1 and attached to plate 102 by means of brackets (not shown), which extend through suitable openings formed in plate 1. Mounted on plate 102 are a spindle 104 to removably support a roll 105 of adhesive splicing tape 106; a guide roller 114 for tape 106; a splicing tape feed mechanism 107 to advance the splicing tape 106 from roll 105 to the splicing position; and a splicing head assembly 108, which receives the splicing tape from the feed mechanism and applies the same under pressure to the tape to be spliced on splicing block 70. The splicing tape feed mechanism 107 includes a splicing tape holding block 110 and a pneumatic cylinder 109 adapted to reciprocally move block 110 with respect to plate 102 to effectuate splicing tape advancement. The holding block 110 is rectangular in shape and has an elongated guide groove 115 formed in the lower surface thereof for receiving and holding a section of splicing tape 106. A plurality of passages 116 are formed within the block 110 and connect the upper surface of groove 115 with a central bore or chamber 117. A hollow adaptor 118 in communication with central bore 117 is connected to a vacuum source via line 111. In this manner, splicing tape 106 can be held within groove 115 by suction during the feeding operation.

The splicing head assembly 108 comprises a pressure block 112 having a cylindrical chamber 120 formed in the upper portion thereof, a rectangular shaped chamber 121 formed in the lower portion thereof, and a horizontal bottom surface 124, to which is attached a rubber pressure pad 125. A rectangular cross-section splicing head 113 is slidably disposed within chamber 121 of the pressure block 112, and is guided for vertical movement therein by the internal sides of the chamber which are shown in FIG. 15. Splicing head 113 is formed with a slot 113a which serves as a guide passage for splicing tape applicator 157. Applicator 157 is slidably disposed within slot 113a for vertical reciprocal movement. A splicing tape pressure pad 145 is attached to the bottom surface of splicing applicator 157 and is adapted to receive the splicing tape from splicing block 110 and hold the same in the proper position for application to the abutting ends of the leader tape and the supply tape in splicing block 70. At least two passages 146 formed in the splicing applicator 157 terminate at the bottom surface of pad 145 and are connected via central passage 146*a*, adaptor 147 and line 148 to a vacuum source to provide suction to hold the splicing tape on the pad 145. A T-shaped pin 149 is disposed within chamber 120 of pressure block 112, extends downwardly via passage 151 into chamber 121 and is threadably attached to the top of head 113. A helical compression spring 150 disposed within chamber 120 urges the head portion of pin 149 toward the bottom of chamber 120. A helical tension spring 153 is connected at one end to the pressure block 112 above chamber 121 by means of screw 154, and is connected at the other end to the line adaptor 147 to urge connector 146*a* of splicing applicator 157 into a groove 113b formed at the bottom of splicing head 113.

A solenoid operated pneumatic cylinder 122 is fixedly mounted on plate 102, and has a piston arm 123 which is attached to the upper surface of pressure block 112 to reciprocally move the splicing head assembly 108 between a splicing tape pickup position, as shown in FIG. 9, and a splicing position in which the splicing tape held on pad 145 of splicing applicator 157 is placed in contact with the supply tape and leader tape positioned upon splicing block 70. Another pneumatic cylinder 155 is rigidly secured to plate 1, and has a piston rod 156, which extends upwardly behind splicing block 70 and is in operative engagement with the bottom surface of splicing head 113, at a point located behind splicing applicator 157. Actuation of cylinder 155 overcomes the downward biasing force of compression spring 150 and thereby lifts splicing foot 113 and applicator 157 within chamber 121 to a vertical point in which the bottom surface of pad 145 is in alignment with the bottom of pressure pad 125. The top surface of head 113 contacts surface 158 of chamber 121 to stop the upward movement of splicing head 113. A rubber pad 152 is attached to the top of applicator 157 to cushion the impact of the applicator upon its contact with the splicing block after actuation of cylinder 122. The splicing head 113 and applicator 157 is held in the lifted position during the splicing tape cutting operation, which is described in more detail hereinafter. When cylinder 155 is deactivated, piston rod 156 is withdrawn, and spring 150 returns splicing head 113 and applicator 157 to tape receiving position from which it is lowered by cylinder 122 onto splicing block 70.

The splicing assembly 73 is initially set up for operation by withdrawing a portion of splicing tape 106 from roll 105, threading the same around guide roller 114, and placing a section thereof within guide groove 115 of block 110 with the leading end 57 overhanding the end of the block a sufficient distance, so that it may be picked up by pad 145 of splicing applicator 157 upon advancement of the transport means 107. Vacuum line 111 is then actuated to hold the splicing tape in place by suction. All subsequent operations of the splicing assembly, until the supply of splicing tape is exhausted, are fully automatic. At the appropriate instant, during each cutting, splicing and winding cycle of the instant apparatus, pneumatic cylinder 109 is actuated to advance holding block 110 from the position shown in FIG. 9 to a position whereby the leading end 57 of the splicing tape 106 extends beneath splicing applicator 157. At that point, vacuum line 148 is actuated to secure end 57 upon pad 145 and vacuum line 111 is deactivated so that holding block 110 releases its hold upon splicing tape 106. Cylinder 109 then retracts block 110 to the starting position and vacuum line 111 is again actuated to secure the next section of splicing tape in place within guide groove 115. A microswitch 56 is mounted on plate 102 in the splicing tape betwen guide roller 114 and holding block 110. An actuating button 58 of the microswitch is held in a depressed position by the presence of splicing tape 106 and is released when the splicing tape is depleted, to provide a suitable signal indicating that the supply of splicing tape must be replenished. As an alternative to microswitch 56, a photo-sensitive cell can be provided to signal the depletion of the splicing tape. When this occurs, the loading cycle of the particular cassette in the loading position is completed and the apparatus is automatically stopped until a new supply of splicing tape is provided.

Cutting means 160 comprises a lever 161 having two individuals lever sections 161*a* and 161*b* pivotally mounted by means of shaft 162 on opposite sides of splicing block section 97. The front of lever section 161*a* can be seen in FIG. 9, and top of both lever sections 161a and 161b can be seen in FIG. 5. The lever sections are fixedly mounted on the ends of shaft 162 by any suitable means for movement therewith, and the shaft is journaled within appropriate openings formed in splicing block section 97. Shaft 162 has a gear 165 rigidly attached thereto. Gear 165 is operatively engaged by piston 167 of hydraulic cylinder 166 which is formed with a corresponding rack 167a, so that upon actuation of the hydraulic cylinder the cutting means is pivotally moved from the position shown by the solid lines to the position shown by the dotted lines in FIG. 9. Hydraulic cylinder 166 and the corresponding linkage can be disposed either at the front or rear of splicing block 70 or within a hollow portion thereof.

A foot section 163 extends upwardly from the free ends of both lever sections 161*a* and 161*b*. A thin high impedance wire 164 formed of tungsten or a similar metallic material extends between the two lever sections at the upper end of the foot sections, and is adapted to pass through gap 130 between splicing block sections 96 and 97 to permit pivotal movement of lever 161 between the indicated positions. The wire 164 is connected to a suitable electric circuit which provides, upon actuation thereof, a high potential to heat the wire to a sufficient temperature to enable it to sever the supply tape or leader tape held on splicing block 70 and the splicing tape held within splicing assembly 73. Due to its inherent nature of uniformly heating, the hot wire 164 is adapted to sever the tape on the splicing block and the splicing tape during both its upward and downward movement.

Since the hot wire is attached to a pivotally movable lever it tends to contact the tape in the splicing block and the splicing tape at different angles. However, it is preferable that the cutting angles be the same to ensure proper alignment of the different tapes. Accordingly, the splicing tape is severed when it is in the obliquely disposed position shown by the dotted line in FIG. 9, which occurs when splicing foot 113 is held in its raised position by the actuation of pneumatic cylinder 155. By holding the tape in this position during the cutting operation, the hot wire cuts the tape at an angle that matches the cutting angle of the supply tape and leader tape in the splicing block. It can also be seen that the splicing tape is cut in a manner such that the trailing end of the cut section extends beneath pad 125 and the leading end of the supply portion overhangs the end of holding block 110.

After the initial cutting operation during each loading cycle of the apparatus of the invention, that is where the leader tape held in the first position of the splicing block 70 is cut and a section of splicing tape is cut, lever arm 161 of the cutting means 160 is held in its uppermost position. At that point, the cylinder 155 is deactivated, permitting spring 150 to return splicing foot 113 to the splicing tape receiving position. Splicing cylinder 122 is then automatically actuated to lower the entire splicing head assembly 108 into a splicing position, wherein the section of splicing tape held within groove 145 of splicing foot 113 is applied under pressure to abutting sections of supply and leader tape held in the splicing block 70. Continued pressure applied to the splicing head assembly 108 by means of air cylinder 122 causes compression of spring 150 to the point where rubber pressure pad 125 contacts the overhanging portion of the cut splicing tape and applies the same under pressure to the tape on the splicing block. This assures that the entire section of splicing tape which is cut by the cutting means 160 is uniformly applied to abutting sections of supply tape and leader tape.

Upon completion of the foregoing splicing operation, cylinder 122 returns the splicing head assembly 108 to its tape receiving position, whereupon splicing tape feed means 107 is again actuated to transport the overhanging leading end 57 of the splicing tape held within block 110 to a position whereby it is picked up within groove 145 of splicing foot 113 and splicing foot 113 is raised by cylinder 155. All of this occurs with the lever 161 of the cutting means 160 held in its raised position. The holding block 110 is adapted to move between lever arm sections 161a and 161b and beneath hot wire 164 to transport the splicing tape to the splicing head assembly and return to its starting position. At that point, the cutting means actuating cylinder 166 returns the lever arm 161 to its starting position, to cut the next section of splicing tape and the tape held in the second position of splicing block 70.

Figure 10:
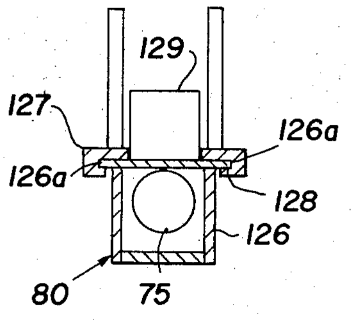
FIG. 10 is a cross-sectional view of the drive motor transport assembly taken along the line 10—10 of FIG. 7.

The cassette drive means 74 and the transport means 80 upon which the drive means is mounted are shown in FIGS. 6, 7 and 10. As mentioned hereinbefore, the drive means comprises an electric motor 75 having a stub axle 76 adapted to operatively engage take-up spool aperture 5 of a cassette held in the loading position. Motor 75 is preferably of the variable speed type to permit adjustments in the take-up speed of the tape during the winding operation. In particular, it maybe desirable to reduce or stop the cassette take-up speed as the tape nears the end of the tape length to be wound into each cassette, to avoid overwinding. This is accomplished by means of transducer 78 (FIG. 1) which picks up an audible signal on tape 3 indicating the end of a predetermined tape segment and in response thereto emits a control signal to reduce the speed of or stop motor 75. The motor and/or the stub axle can be adapted to slip when sufficient tension is applied to the tape being wound. This avoids the breakage when the full amount of tape has been wound into each cassette. Means can be also provided to automatically stop the drive motor 75 when such slippage occurs.

As mentioned hereinbefore, tubular member 60 of the leader tape extraction means is also mounted on transport means 80. Accordingly, transport means 80 is selectively movable between a non-operative position as shown in FIG. 7; a leader tape extracting position, in which tubular member 60 engages aperture 64 of a cassette held in receiver 15, so that nozzle 61 is adjacent leader tape 7; and a drive position in which stub axle 76 operatively engages teeth 9 of spool 4 of the cassette. The transport means 80 comprises a housing 126 slidably mounted on the undersurface of an angle bracket 127, which is fixably attached to plate 1. Referring to FIG. 10 it can be seen that housing 126 is in the form of a rectangular box, the top portion of which has an outwardly extending flange 126a adapted to ride within a corresponding groove 128 formed in the bottom of angle bracket 127. An upstanding lug 129 extends from the top of housing 126 through an opening 186 formed adjacent groove 128 in the bottom portion of bracket 127. A transport cylinder 187 is fixedly mounted on bracket 127 and has a piston arm 188 attached to the upstanding lug 129. Air pressure lines 68 and 69 are connected by suitable fittings to opposite ends of cylinder 187 to provide the necessary pressure to actuate piston arm 188, so as to reciprocally transport housing 126 between the three positions described above via opening 63 formed in plate 1. Cylinder 187 has no intermediate position corresponding to the leader tape extracting position. Therefore, to stop the housing 126 in the leader tape extracting position, a transport limit cylinder 189 mounted on plate 1 is provided. Cylinder 189 is connected to air pressure lines 173 and 174 and has a piston arm 171 and a stop lug 172 formed on the end thereof. Upon actuation of cylinder 189, piston arm 171 is extended to position stop lug 172 between upstanding lug 129 of the transport housing 128 and the vertical portion of bracket 127, thereby stopping the inward movement of the transport means, with tube 60 in the proper location for the extraction of the leader tape contained within a cassette. In operation, after the leader tape is extracted, cylinder 189 is actuated to raise piston arm 171 and stop lug 172 out of its obstructing position between lug 129 and the vertical portion of bracket 127, so as to permit cylinder 187 to move transport housing 126 into the spool drive position.

Cassette ejection means 175 for discharging fully loaded cassettes from the receiver 15 is also mounted on housing 126 of transport means 80. The ejection means comprises a pneumatic cylinder 176 having a reciprocally movable piston arm 177 and a pusher lug 178 mounted on the end thereof. An air line 179 is connected to the end of cylinder 176 to provide the necessary pressure. The ejection means is operative in the fully withdrawn position of the transport means 80, when the cassette receiver 15 is disposed in a horizontal position as shown in FIG. 8. Upon actuation of cylinder 176, pusher lug 178 enters receiver 15 along an open edge thereof between plates 17 and engages the closed edge portion of cassette 12 to push the same out of the receiver. A chute 180 is provided to catch or direct the cassettes as they are ejected from the receiver. After ejection, piston arm 177 and pusher lug 178 are retracted into the confines of housing 126, so that they do not interfere with the other operations of the cassette winding apparatus of the invention.

Referring once again to FIG. 1, several additional components in the apparatus of the invention are shown. An electronic counter, such as a Durant Series 2000 counter, having a transducer wheel 181, one foot in circumference, is mounted on plate 1 in the path of supply tape 3. The counter operates individually in case of blank tape and in conjunction with the transducers 77 and 78 in the case of prerecorded tape to provide a signal to stop the cassette drive motor 75 when a predetermined amount of tape has been loaded within cassette 12. The counter provides ten pulses per revolution, to measure the amount of blank tape in one tenth of a foot increments to be loaded into each cassette.

Also mounted on plate 1 is a lever arm 182 having a roller 183 rotatably mounted on the end thereof, adapted to maintain the proper tension on tape 3 during the winding operation. The lever 182 is gravity biased against tape 3. It will be apparent to those skilled in the art that a vacuum plenum adapted to receive a loop of tape can be substituted for the lever arm 182. An automatically retractable guide roller 185 is provided between housing 71 and splicing block 70 to guide the supply tape 3 during the tape winding operation. The roller 185 is adapted to be withdrawn through an opening in plate 1 during the leader tape extracting and positioning operations, and thus avoids obstructing the vertical movement of splicing block 70 into engagement with the bottom of housing 71. A tape supply detector, comprising a pivoted lever arm 184 gravity biased against tape 3, is mounted above supply reel 8. The tape detector has a microswitch associated therewith (not shown) adapted to be actuated when the supply of tape on reel 8 is depleted to a predetermined minimum to automatically stop the apparatus upon the loading of a complete program into the cassette in the tape loading position. The minimum tape quantity which activates the detector can be set to insure that no cassette will be in a partially loaded state when the apparatus is stopped.

Figure 11A:
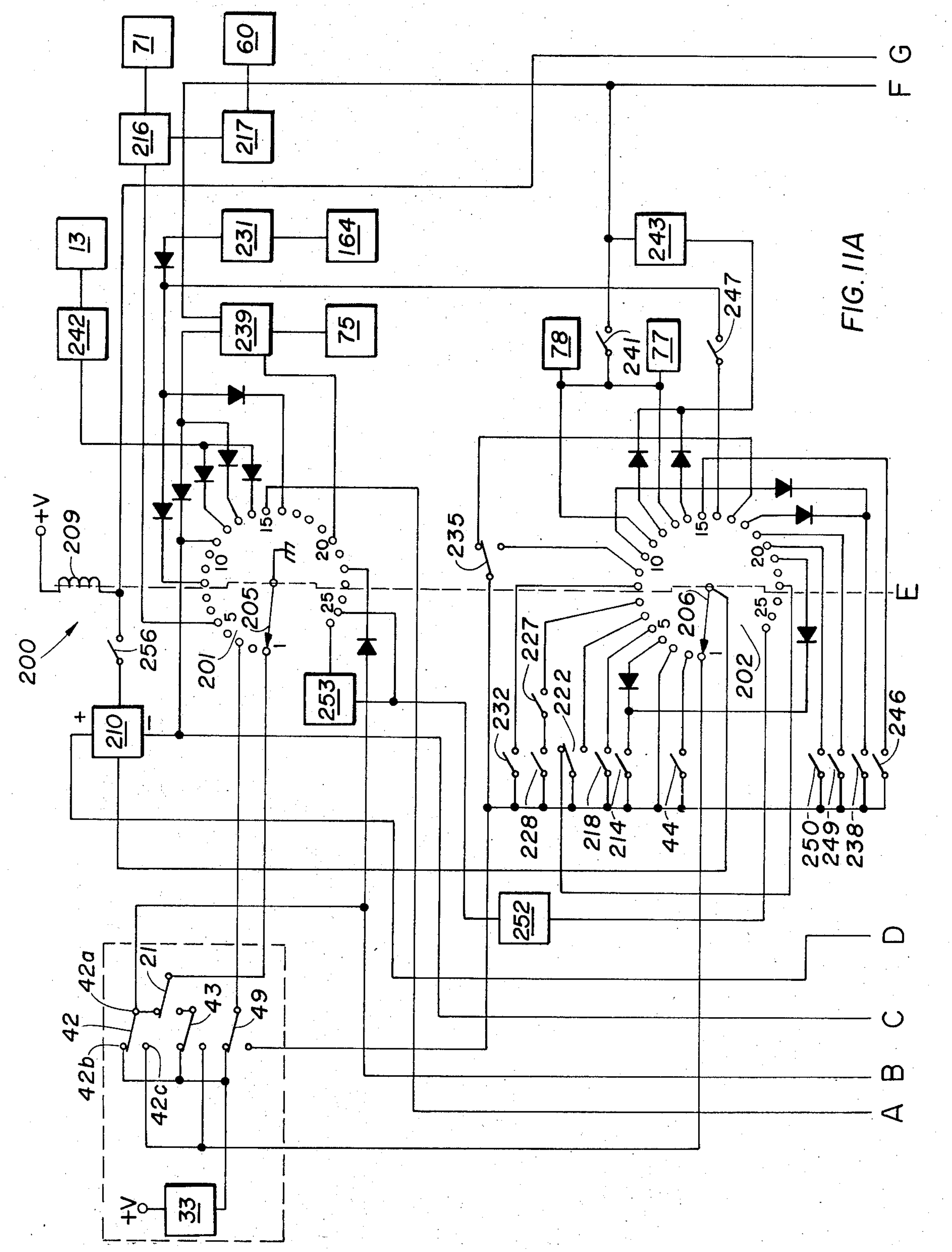
FIGS. 11A and 11B are schematic drawings of the control circuit for the winding apparatus of the invention (two sheets).
Figure 11B:
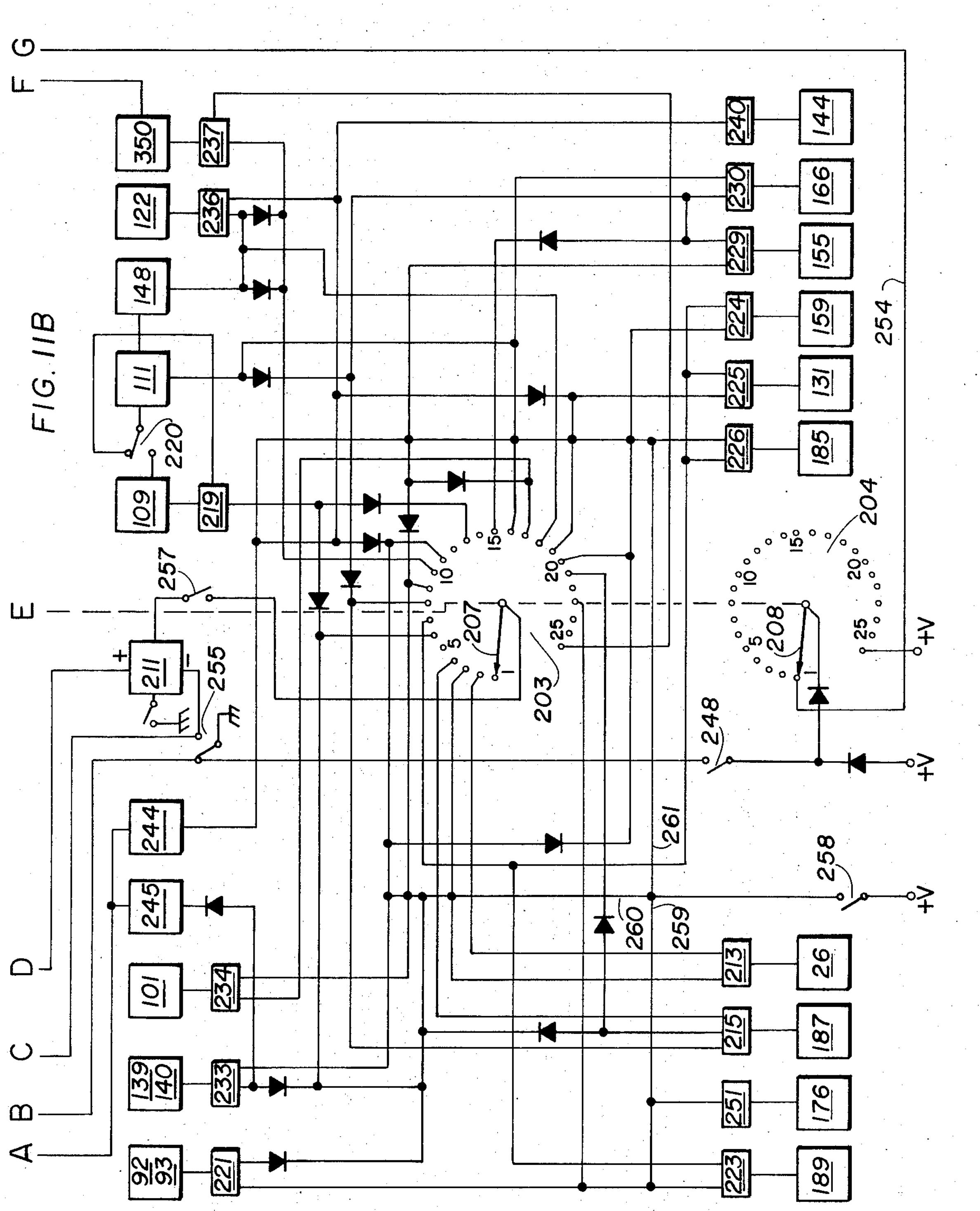

All of the foregoing components and subassemblies of the winding apparatus of the invention are automatically operated on a sequential basis by means of the control circuit, which is shown schematically in FIG. 11. The heart of the circuit is a four-level twenty-six position solenoid operated stepper switch 200. The first level 201 is adapted to actuate electronic devices which control the operation of such components as the drive motor, the hot wire and the supply tape hub brake. The second level 202 sequentially selects the appropriate microswitch circuit which is actuated upon the completion of each particular operation and provides a signal to advance all four levels of the stepper switch to the next position. The third level 203 of the stepper 200 determines which of the pneumatically operated functions will next occur. Finally, the fourth level 204 is connected to a manually operable clearing circuit which returns all functions to their starting position upon its actuation.

Figure 12:
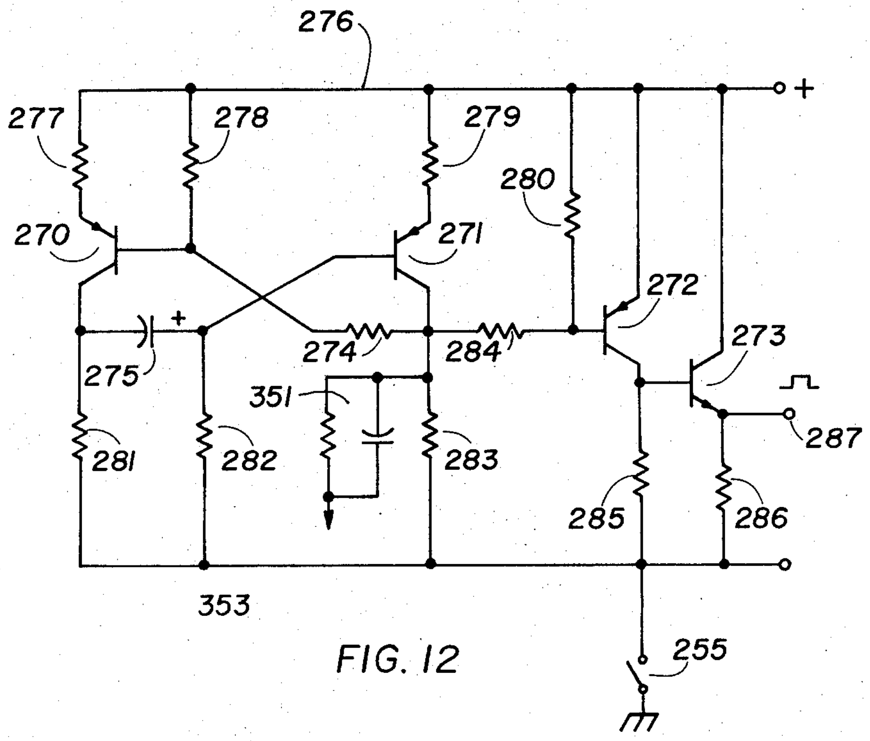
FIG. 12 is a schematic drawing of a typical monostable circuit used in the control circuit of the apparatus.

Level 201 through 204 have associated therewith movable contact arms 205 through 208, respectively. The contact arms are connected to a common shaft for simultaneous advancement from one position to the next by means of stepper relay 209. A monostable circuit 210 provides the necessary pulses to energize relay 209 and thereby advance the stepper. The circuit to the stepper mono 210 is completed by the actuation of the appropriate microswitch connected to the various contact points of stepper level 202. Stepper relay 209 has normally closed interrupting contacts 352 which are opened upon each actuation of the relay. These contacts are connected to a driver monostable circuit 211, which in turn is connected to contact arm 207 of stepper level 203 to provide the necessary driving pulses to actuate the solenoid switches and valves associated with each of the pneumatically operated functions. A typical monostable circuit which can be utilized for the stepper relay and for the drive is shown in FIG. 12 and will be described hereinafter.

Perhaps the best way to understand the schematic of FIG. 11 is to first review the various components in the circuit connected to each position of each level of the stepper switch 200. Firstly, it should be noted that contact arm 205 of level 201 is connected to ground; contact arm 206 of level 202 is connected to the input of stepper mono 210; contact arm 107 is connected to the output of driver mono 211 and contact arm 208 is connected to the clearing circuit.

Position 1 of level 201 is connected to single-pole double-throw microswitch 21, disposed at the bottom of magazine 11 to indicate the orientation of the bottom-most cassette in the magazine, and the direction in which the cassette receiver should be rotated to receive such cassette. Single-pole double-throw microswitches 42 and 43 normally biased in the position shown are connected, respectively, to each of the poles of microswitch 21, are part of the Geneva drive indexing mechanism, and are actuated by their engagement with grooves 48 and 39, respectively, of cylinder 37 to stop the Geneva drive motor 33 in the proper position. The position of microswitch 21 determines which of the switches 42 or 43 will be in the circuit and thus determines the extent of rotational movement required for the Geneva drive. One pole of each of the switches 42 and 43 is connected to terminal 1 of stepper level 202 via microswitch 49. Contact arm 206 of level 202 is connected to the stepper monostable 210, so that in position 1 actuation of either switch 42 or 43 completes the circuit to stepper mono 210 and thus activates stepper relay 209 to advance the contact arms of all levels of the stepper switch to the next position.

Position number 2 of level 201 is open and thereby disables the Geneva indexing mechanism. Position number 2 of level 203 is connected to solenoid 213 of the cassette feed means 26, which upon actuation, advances a cassette from the magazine to the receiver. The appropriate signal to actuate solenoid 213 is provided by driver mono 211. Position number 2 of level 202 is connected to single-pole single-throw microswitch 44, which provides a signal upon the insertion of a cassette into receiver 15 to advance the stepper switch to the next position.

Position 3 of level 201 is connected to single-pole double-throw microswitch 49 which is normally biased in the position shown to reactivate motor 33 to rotate receiver 15 into the tape loading position, and which is actuated upon the completion of the Geneva cycle, to cut the power to motor 33. Position 3 of level 202 is connected to one of the poles of microswitch 49 so that upon actuation thereof the circuit to stepper mono 210 is completed to advance the stepper to the next position. Terminal 3 of level 203 is connected to solenoid 213 of the cassette feed means 26 to actuate the same to retract pusher arm 28 from magazine 11.

Terminal 4 of level 201 is open. Terminal number 4 of level 202 is connected to microswitch 214, which is mounted above the drive motor transport 80 to indicate when the transport has reached the leader tape extracting position. Accordingly, position 4 of level 203 is connected to solenoid 215 of the drive motor transport cylinder 187 and is adapted to actuate cylinder 187 so as to advance the drive motor transport into its leader tape extracting position, at which point microswitch 214 is closed and the stepper relay advances the stepper switches to position number 5. It should be noted that at start-up cylinder 189 controlling stop lug 172, which limits the inward travel of the drive transport 80 is in its actuated obstructing position to stop the drive transport in its intermediate or leader tape extrating position upon the actuation of the drive transport cylinder 187 in position 4 of level 203. It should also be noted that splicing block 70 at start-up is disposed in its raised position in sealing engagement with vacuum plenum 72, so as to receive the leader tape withdrawn from the cassette in the loading position.

Figure 13:
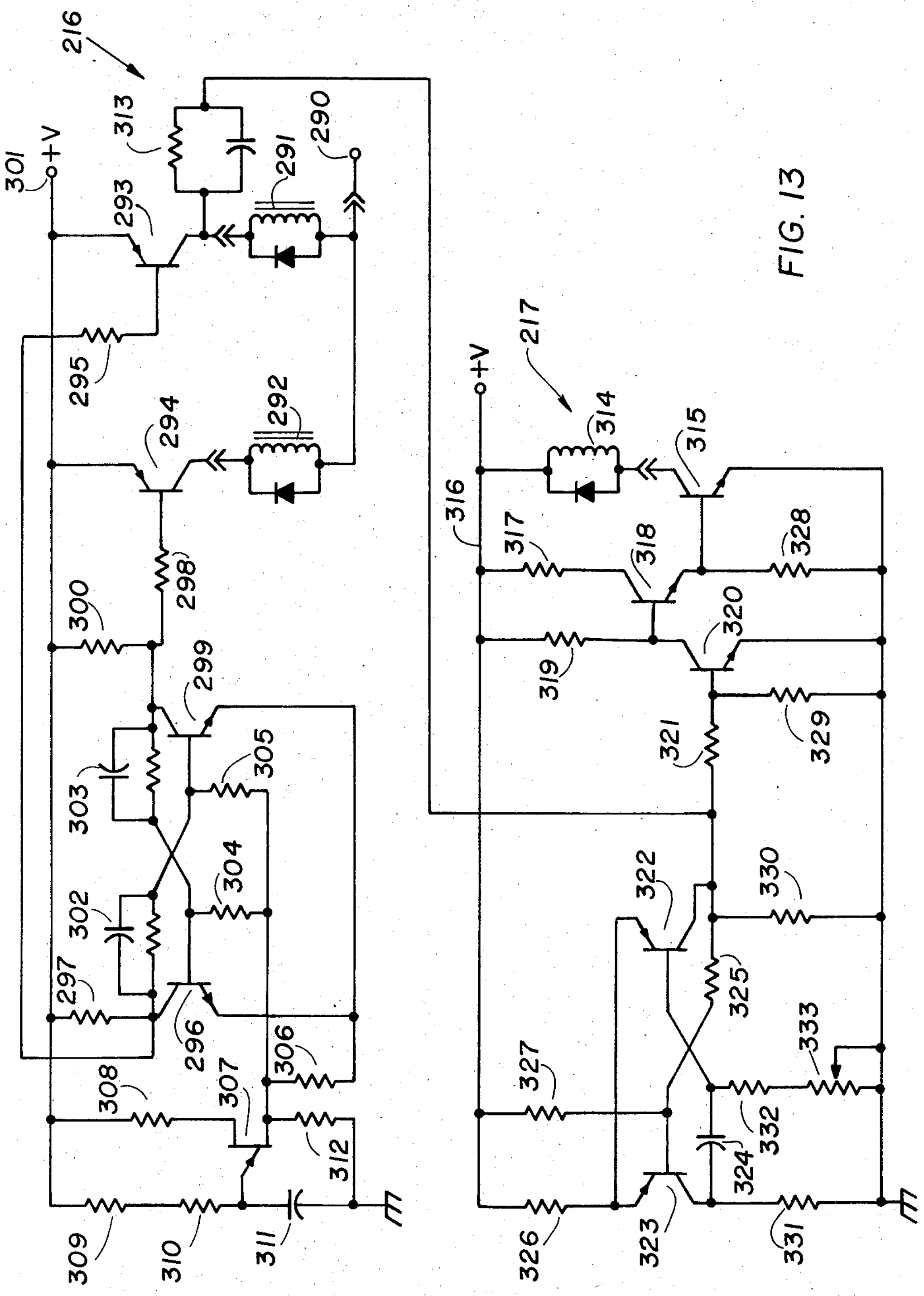
FIG. 13 is a schematic drawing of the plenum Flip-Flop circuit and the hot wire monostable circuit used in the apparatus.

Terminal number 5 of stepper level 201 is connected to flip flop circuit 216 and monostable circuit 217, which circuits respectively control the vacuum applied to the opposite ends of vacuum plenum housing 71, and the high pressure air applied to leader extracting means 60, to extract the leader tape from a cassette in the loading position and to position the extracted leader tape within guide grooves 98 and 99 of splicing block 70. These circuits are shown in FIG. 13 and are described more fully hereinafter. Position number 5 of stepper level 202 is connected to flow-sensitive switch 218 disposed within the vacuum lines connected to plenum 72 and responsive to the cessation of vacuum flow within such lines when leader tape 7 has filled the plenum and obstructs the flow of air into end adaptors 83 and 84, to actuate stepper mono 210 and thereby advance stepper switch 200 to the next position.

Terminal 6 of stepper level 203 is connected to solenoid 215 of the driver motor transport cylinder 86 to retract the drive motor transport from the leader tape extracting position, and is also connected to solenoid 219 of the splicing tape feed cylinder 109 located on the splicing assembly. Actuation of solenoid 219 initiates an independent splicing tape feed cycle, comprising the actuation of splicing tape feed cylinder 109 to advance and return splicing tape holding block 110 to transport the splicing tape from reel 105 to splicing foot 113, and the sequential application of vacuum to line 111 of holding block 110 and to line 148 of splicing foot 113 to effectuate the transfer of splicing tape from the holding block to the splicing foot. Microswitch 220 is located in the path of holding block 110 and is actuated by the holding block to initiate the vacuum in splicing foot 113 when the holding block is adjacent the splicing foot, and to initiate the vacuum in the holding block when the holding block has returned to its splicing tape receiving position. Switch 220 also energizes solenoid 219 to return the splicing feed tape cylinder 109 to its starting position. Terminal 6 of level 203 is also connected to solenoid 221, which upon energization actuates the splicing block lift cylinders 92 and 93 to lower splicing block 70 into the splicing position simultaneously with the operation of the independent splicing tape feed cycle described above. Single-pole double-throw microswitch 222 having one terminal connected to position 6 of stepper level 202 is disposed below splicing block 70 and is actuated when the splicing block is lowered by cylinders 92 and 93 into the splicing position, to advance stepper switch 200 to the next position.

Position 7 of stepper level 203 is connected to solenoid 223 of the drive motor transport limit cylinder 189 and is energized in this position to retract stop lug 172 from its transport obstructing position. Terminal 7 of level 203 is also connected to solenoid 224 of the splicing assembly transport cylinder 159 to actuate the same for movement into the splicing position, to solenoid 225, which controls a suitable cylinder for moving guide roller 131 located in the entrance passage of housing 71 into a position for guiding the tape to be wound within the cassette, and to solenoid 226, which similarly controls the axial movement of guide roller 185 to position the same in the tape path during the winding operation. Microswitches 227 and 228 are connected in series to terminal number 7 of stepper level 202 and are, respectively, actuated by the splicing assembly transport in the splicing position, and the splicing tape holding block 110 in its retracted tape receiving position. Closing both of these switches actuates stepper mono 210 to advance stepper switch 200 to the next position.

Position number 8 of level 203 is connected to solenoid 215 of the drive motor transport cylinder to actuate the same to advance stub axle 76 of the drive motor 75 into operative engagement with spool 4 of a cassette in the loading position. Terminal 8 of level 203 is also connected to solenoid 229 of the splicing foot lift cylinder 155, which upon actuation raises splicing foot 113 into a splicing tape cutting position, and to solenoid 230, which controls the operation of cylinder 166 to pivotally raise lever 161 and the hot wire attached thereto from a position below the surface of splicing block 70 to a position above splicing tape holding block 110. Position number 8 of stepper level 201 is connected to hot wire monostable circuit 231 which provides electrical current to heat hot wire 164 to the proper cutting temperature simultaneously with the pivotal movement described above, so as to cut the leader tape held within guide grooves 98 and 99 and to cut a section of splicing tape. Terminal 8 of level 202 is connected to microswitch 232 which is actuated by lever 161 of the cutting means at the top of its pivotal movement to actuate stepper mono 210 and thereby advance the stepper switches to their next position.

Terminal 9 of stepper level 203 is connected to solenoid 234 of the splicing block shift cylinder 101, which is adapted upon actuation to laterally move splicing block section 97 from its first position, in which guide grooves 99 and 98 are in axial alignment, to its second position, in which guide grooves 100 and 98 are in axial alignment. Terminal 9 of level 203 is also connected to solenoid 229 to deactivate splicing foot lift cylinder 155 to permit spring 150 to return the same to its splicing tape receiving and splicing position. Terminal 9 of stepper level 202 is connected to one terminal of single-pole double-throw microswitch 235, which is disposed adjacent splicing block section 97 and is actuated by the movement of splicing block section 97 into its second position, to advance the stepper switch 200 to position number 10.

Terminal number 10 of stepper level 203 is connected to solenoid 236 of the splicing head cylinder 122 which is adapted upon actuation to lower splicing head assembly 108 to apply cut the section of the splicing tape under pressure to the abutting ends of supply tape and leader tape held on splicing block 70. Terminal 10 is also connected to the control valve of vacuum line 148 of splicing foot 113 to deactivate the same during the splicing operation to insure that the cut section of splicing tape applied to the supply tape and leader tape on the splicing block will be released. In addition, position 10 of level 203 is also connected to a further solenoid 237, which is adapted upon energization to reset rotatable tape counter 181 to its starting position. Terminal 10 of stepper level 202 is connected to microswitch 238 juxtaposed adjacent splicing block 70 and adapted to be closed by splicing head assembly 108 upon the application of the splicing tape to the tape on the splicing block. This once again completes the circuit to stepper mono 210 and thereby advances each level of stepper switch 200 to its next position.

Position 11 of stepper level 201 is connected to a drive speed control circuit 239, which provides the necessary electrical power to energize drive motor 75 for winding the supply tape into a cassette. The drive speed control circuit has both a high and a low input to sequentially control by means of the stepper switches the speed of drive motor 75 during different phases of the winding operation. In position 11, as shown, the stepper switch is connectd to the high speed portion of control circuit 239. The transducer wheel 181 of electronic counter 350 is connected to the high speed portion of control circuit 239 to provide an error signal to maintain a constant tape winding speed. Referring to stepper level 203, it can be seen that terminal 11 is connected to solenoid 233 which is adapted in this instance to deactivate the vacuum in lines 139 and 140 connected to splicing block 70 and thus release the tape held within guide grooves 98 and 100. Terminal 11 of level 203 is also connected to solenoid 236 which in this instance is adapted to actuate the splicing head cylinder to raise splicing head assembly 108 to its splicing tape receiving position spaced above the splicing block, and to solenoid 240, which controls the tape clamp cylinder 144 to release the supply tape held on roller 138. Terminal 11 of stepper level 202 is connected via a suitable amplifier (not shown) to transducer 78 located in the tape path. An inaudible signal recorded at or near the beginning of each tape program is picked up by transducer 78, amplified, and utilized to actuate stepper mono 210 to advance the stepper to the next position. The electronic tape counter 350 is also connected to terminal 11 of stepper level 202 by means of a manually operable switch 24, which is located on control panel 10 on the front of the apparatus. The counter is selectively placed in the circuit to measure the appropriate amount of blank supply tape to be loaded in a cassette by providing a signal to terminal 11 to advance the stepper to the next position when a preset length of tape has been so loaded.

In position 12, the contact point of stepper level 201 is connected to tensioning motor 242 of the supply reel hub 13 to apply a reverse torque to the hub and thereby brake the tape winding operation. It should be noted that the movement of contact arm 205 from position 11 to position 12 on stepper lever 201 disengages drive speed control circuit 239 and thereby cuts the power to drive motor 75 simultaneously with the application of the braking force via tensioning motor 242. Position 12 of stepper level 202 is connected to a motion sense circuit 243, which is adapted to provide an advancement signal to the stepper mono 210 via level 203 when the tape counter comes to a complete stop.

Terminal 13 of stepper level 201 is connected to the high speed portion of speed control circuit 239, so that upon movement of contact arm 205 into position 13, the drive motor is once again activated to full power to wind the supply tape into the cassette. The purpose of starting, stopping and restarting the cassette drive motor during the initial phases of the winding operation is to provide a chek check all systems to insure that the tape is properly cut and spliced before the full winding operation is commenced. Position 13 of stepper level 203 is connected to solenoid 219 of the splicing tape feed cylinder 109 to initiate a second independent splicing tape feed cycle as described above. Contact 13 of stepper level 202 is connected via an amplifier to pick-up transducer 77 which is also located in the tape path and is adapted to produce a signal to advance the stepper to the next position upon the pick-up of a prerecorded signal indicating the end of the tape program. Alternately, in the case of blank tape, as described above, switch 241 is in the actuated position and mechanical tape counter 181 provides the necessary signal to advance the stepper switch rather than transducer 77.

In position 14, stepper level 201 is connected to tensioning motor 242 to apply a braking force to the supply reel hub 13, and stepper level 202 is connected to motion sense circuit 243 to again provide a stepper advancement signal when the tape counter come to rest. The movement of contact arm 205 of stepper level 201 from position 13 to position 14 deactivates the drive speed control circuit, and thus cuts the power to drive motor 75.

In position 15, stepper level 201 is connected to conventional solid state or electro-mechanical timers 244 and 245. Timer 244 is connected to solenoid 22, and is adapted to energize the same after a predetermined time period to retract guide roller 131 in the entrance passage of housing 71 from the tape path. The retraction of roller 131 permits the supply tape to sag sufficiently so that a section thereof falls within grooves 98 and 100 of the splicing block. Timer 245 is connected to solenoid 233 to reactivate the vacuum in lines 139 and 140 to secure the tape section within the grooves. Position 15 of stepper level 203 is connected to solenoid 229 which is next actuated to raise splicing foot lift cylinder 155 and splicing foot 113 into the splicing tape cutting position. Terminal 15 of stepper level 202 is connected to flow-sensitive switch 246 which is located within splicing block 70 and is responsive to the cessation of vacuum flow created by the placement of the tape within the guide grooves and closure thereby of flow passage 94. When this occurs the stepper relay 209 is actuated to advance the stepper switches to the next position.

Terminal 16 of stepper level 203 is connected to solenoid 230 of the cutting means cylinder 166, and to the splicing tape holding block vacuum supply line 111. The completion of this circuit by contact arm 207 energizes solenoid 230 to activate cylinder 166 to pivotally return the hot wire cutting means to its starting position below the surface of the splicing block 70. Simultaneously therewith, the control pulse from driver mono 211 via stepper level 203 activates a suitable control valve for vacuum line 111 to secure the splicing tape by suction within groove 115 of holding block 110. Terminal 16 of stepper level 201 is connected to the hot wire mono circuit 231 to heat the hot wire so as to cut a section of splicing tape and the supply tape during its downward movement. A microswitch 247 connected to terminal 16 of stepper level 202 is positioned adjacent the hot wire cutting means and is adapted to be actuated thereby in the bottom position of the cutting means to advance the stepper switch.

In position 17, stepper level 203 is connected to solenoid 234 of the splicing block shift cylinder, which upon actuation, returns splicing block section 97 to its first position in which grooves 98 and 99 are in alignment. Terminal 17 of level 203 is also connected to solenoid 229 of the splicing foot lift assembly which upon the receipt of the signal from driver mono 211 disengages the splicing foot to permit its return to the splicing tape receiving position. Terminal 17 of stepper level 202 is connected to one terminal of microswitch 235, which detects the first position of splicing block section 97, and in response thereto actuates stepper mono 210 to advance the stepper switch to the next position.

Terminal 18 of stepper level 203 is connected to the control valve of vacuum supply line 148 of the splicing foot 113 to recommence the suction hold on the splicing tape, and to solenoid 236, which again actuates the splicing head cylinder 122 to effectuate the application of splicing tape to the trailing end of the supply tape and the abutting leader section held within the guide grooves of the splicing block. Terminal 18 of stepper level 202 is connected to microswitch 238, which is actuated by the splicing head in the splicing position to advance the stepper switch to the next position.

Terminal 19 of stepper level 203 is connected to solenoid 226, which, upon receipt of the pulse from driver mono 211, retracts guide roller 185 out of the tape path. Terminal 19 of level 203 is also connected to solenoid 236 to retract the piston arm of splicing head cylinder 122 and the splicing head assembly 108. Terminal 19 of stepper level 202 is connected to microswitch 249, which is positioned above the splicing head assembly, and is actutated upon the retraction of cylinder 122 to energize stepper mono 210 to advance the stepper switch to position 20.

Position 20 of stepper level 203 is connected to solenoid 233, which in this instance deactivates vacuum lines 139 and 140 connected to the splicing block 70. Terminal 20 of stepper level 203 is also connected to solenoid 224 which activates the splicing assembly transport cylinder 159 to return the splicing assembly 73 to its non-operative position. Terminal 20 of stepper level 201 is connected to the low speed portion of drive speed control circuit 239 to energize drive motor 75 to complete the winding operation at its low speed. Microswitch 250 is connected to terminal 20 of stepper level 22, and is positioned adjacent the splicing assembly 73 to be actuated upon the return of the splicing assembly to its non-operative position to advance the stepper switch.

Terminal 21 of stepper level 203 is connected to solenoid 215, which upon energization from driver mono 211 actuates the drive motor transport cylinder 187 to return a transport assembly 80 to its non-operative position. Terminal 21 of stepper level 202 is connected to microswitch 214, which, as described hereinbefore, is actuated by the return of the drive motor transport assembly 80 to the non-operative position. Such actuation completes the circuit to advance the stepper to the next position.

Contact point 22 of stepper level 201 is connected to microswitch 42 of the Geneva logic circuit which upon the movement of contact arm 205 into position 22 activates Geneva drive motor 33 to rotate receiver 15 into the cassette eject position. It should be noted that in the loading position of receiver 15 pole 42*a* of switch 42 is in contact with contact point 42*b* due to its engagement with cylinder 37, thus assuring the energization of motor 33 in position 22 of the stepper switch. Once in the eject position, pole 42*a* of microswitch 42 is switched into contact with point 42*c* by its engagement of groove 40 on cylinder 37 to advance the stepper to the next position.

Contact point 23 of stepper level 203 is connected to solenoid 251, which upon energization activates cassette eject cylinder 176 to discharge the finished cassette from the receiver 15. Terminal 23 of level 203 is also connected to solenoid 221, which activates splicing block lift cylinders 92 and 93 to raise the splicing block 70 into contact with housing 71 to be in position to receive the leader tape from the next cassette, and to solenoid 223 of transport limit cylinder 189 to move lug 172 into its obstructing position to limit the inward movement of drive transport assembly 80 during the initial phases of loading the next cassette. Terminal 23 of stepper level 202 is connected to the remaining terminal of double throw single pole microswitch 222, which is activated by the splicing block in the leader tape receiving position to complete the circuit to stepper mono 210, and thereby advance the stepper switches to position 24.

Terminal 24 and 25 of stepper level 201 are connected to the input of timer 252. Similarly, terminals 24, 25 and 26 of stepper level 202 are connected to the output of timer 252. The purpose of the timer is to provide a signal to actuate stepper monostable 210 to incrementally advance the stepper switches from position 24 to position 26. Terminal 26 of stepper level 203 is connected to solenoid 237 of the mechanical tape counter to reset the counter prior to the advancement of the next cassette from the magazine to the receiver. Terminal 26 of stepper level 201 is connected to timer 252 via an out of material gate 253, which, as will be described hereinafter, opens the circuit to timer 252 when the supply of cassettes, magnetic tape or splicing tape has reached a predetermined minimum. If this occurs, the system is automatically stopped in position 26 and can be reactivated only by the replacement of the deficient supplies. If there is, on the other hand, a sufficient quantity of cassettes, magnetic tape and splicing tape, gate 253 will remain closed to complete the circuit to timer 252, which in turn advances stepper switch 200 to position 1 to commence the next loading cycle.

Terminals 1 through 25 of stepper level 204 are tied together electrically and are connected via line 254 to stepper relay 209. Contact arm 208 is connected to a manually operable conrol switch 248 mounted on the front panel of the apparatus and adapted to switch the apparatus from manual operation, when the switch is closed, to automatic operation, when the switch is opened. Terminal 26 of stepper level 204 is connected to a positive voltage source.

To clear the circuit and return each component and subassembly to its starting position at any time during the operation of the apparatus, a series of four switches 255, 256, 257 and 258, all mechanically interconnected by a common actuator mounted on the control panel of the apparatus, are provided. The actuation of these switches also automatically advances stepper switch 200 to position 26. Switch 255 is a single-pole double-throw switch, which normally connects the negative terminals of the driver mono and the stepper mono to ground, and which, upon actuation, connects arm 208 of level 204 to ground. Switch 256 is disposed in the line connecting the output of the stepper mono 210 and the input stepper relay 209. This switch is normally closed and is adapted upon actuation to open the circuit between the stepper mono and the stepper relay. Similarly, switch 257 is disposed in the line which connects the output of the driver mono 211 and contact arm 207 of stepper level 203. This switch is also normally closed and is adapted upon activation to prevent the transmittal of driver pulses via stepper level 203. Switch 258 is connected at one terminal to a positive voltage source and at the other terminal to lines 259, 260, and 261, each of which is connected to the various solenoids described hereinabove in a manner such that actuation of switch 258 provides a positive voltage to each solenoid to return the air cylinders and vacuum control valves associated therewith to their starting positions. Since positions 1 through 25 of stepper level 204 are connected to the base of stepper relay 209, upon actuation of the clear switches, contact arm 208 is connected to the ground terminal via switch 255 to complete the circuit to stepper relay 209 and thereby advance stepper switch 200 to position 26. It should be noted that the clear functions are operable only when automatic/manual switch 248 is in the manual or closed position.

It can be seen throughout FIG. 11 that many diodes are disposed in the various lines connecting the stepper switch levels and the respective solenoids and circuits connected thereto. As will be apparent to those skilled in the art, the purpose of these diodes is to direct the current flow to or from the desired component to be energized or de-energized in each switch position of each stepper level. Accordingly, specific reference to each diode and its particular function in the circuit will not be undertaken.

It should also be noted that the solenoids referred to herein include transistorized driver circuits which are actuated by the pulses received from driver mono 211. Such circuits are well known in the art and a description of their specific details will not be included herein. Furthermore, in some instances more than one solenoid and/or driver circuit are required to control particular pneumatic cylinders and vacuum lines utilized in the apparatus. It will be understood, therefore, by those skilled in the art, that reference to single solenoids includes a plurality of such solenoids where the particular function so requires.

Referring now to FIG. 12, a typical monostable circuit which can be utilized for both the stepper and driver monos is shown. The circuit comprises three PNP transistors 270, 271 and 272 and an NPN transistor 273. The base of transistor 270 is connected to the collector of transistor 271 by means of resistor 274. Similarly, the base of transistor 271 is connected to the collector of transistor 270 by means of capacitor 275. A positive voltage source is applied to line 276, to which is connected the emitter of transistor 270 by means of resistor 277, and the base of transistor 270 by means of resistor 278. Line 276 is also connected to the emitter of transistor 271 by means of resistor 279, to the base of resistor 272 by means of resistor 280, to the emitter of transistor 272, and the collector of transistor 273.

Input pulses are applied to the collector of transistor 271 via RC network 351, which is connected to contact arm 206 in the case of stepper mono 210 and to contacts 352 of the stepper relay 209 in the case of driver mono 211. Resistors 281 and 282 connect line 353 with opposite sides of capacitor 275. Resistor 283 connects line 280 to the collector of transistor 271. In addition, the collector of transistor 271 is also connected to the base of transistor 272 by means of resistor 284. Finally, line 280 is connected to the collector of transistor 272 and the base of transistor 273 by resistor 285, and is further connected to the emitter of transistor 273 via resistor 286. Switch 255 described hereinabove selectively connects line 280 with ground. An input pulse received at the collector of transistor 271 actuates the circuit to produce a square wave output pulse at the emitter of transistor 273, which pulse is transmitted via terminal 287 to stepper relay 209 in the case of stepper mono and contact arm 207 in the case of driver mono 211.

FIG. 13 illustrates the vacuum plenum flip-flop circuit 216 and the air jet monostable circuit 217 used in the extraction of the leader tape from each cassette. Terminal 290 connects circuit 216 to terminal number 5 of stepper level 201. Terminal 290 is connected to a pair of solenoid valves 291 and 292, which, respectively, control the supply of vacuum flow at each end of vacuum plenum housing 72. Valve 291 is connected to the collector of a PNP transistor 293, and valve 292 is connected to the collector of another PNP transistor 294. These transistors are adapted to alternately pulse valves 291 and 292, so as to obtain the alternate application of suction at opposite ends of the vacuum plenum.

The base of transistor 293 is connected via resistor 295 to the collector of an NPN transistor 296. Similarly, the emitter of transistor 293 is also connected to the collector of transistor 296 by means of resistor 297. The base of transistor 294 is connected via resistor 298 to the collector of another NPN transistor 299, and the emitter of transistor 294 is connected to the collector of transistor 299 by means of resistor 300. A positive voltage is applied at terminal 301 which is connected to the emitters of transistors 293 and 294 and the collectors of transistors 296 and 299. The collector of transistor 296 is connected to the base of transistor 299 by means of RC network 302. Similarly, the collector of transistor 299 is connected to the base of transistor 296 via RC network 303. Resistors 304 and 305 connect the bases of transistors 296 and 299 respectively, with the emitter of transistor 299 via a further resistor 306, and to one base terminal of unijunction transistor 307. The other base terminal of diode 307 is connected by means of resistor 308, to terminal 301. A resistor 309 and a variable resistor 310 arranged in series connects the input terminal 301 with the emitter of unijunction transistor 307. In addition, the emitter of transistor 307 is connected to ground via capacitor 311. Similarly, one base terminal of transistor 307 is also connected to ground by means of resistor 312. RC network 313, connected to the collector of transistor 293 serves as the trigger to actuate the air jet mono circuit 217.

The air jet mono circuit comprises a solenoid valve 314 controlling the supply of air to leader tape extracting means 60. Valve 314 is connected at one end to the collector of an NPN transistor 315 and at the other end to line 316, which is connected to a positive voltage source. Line 316 is also connected via resistor 317 to the collector of another NPN transistor 318 and to the base of transistor 318 by means of resistor 319. The base of transistor 318 is also connected to the collector of a still further NPN transistor 320, the base of which is connected to air jet trigger 313 via resistor 321. The air jet trigger is also connected to the collector of a PNP transistor 322. The emitter of transistor 322 is connected to the emitter of another PNP transistor 323 and the base of transistor 322 is connected to the collector of transistor 323 by means of capacitor 324. Similarly, the base of transistor 323 is connected to the collector of transistor 322 by means of resistor 325. In addition, the emitter of transistor 323, and the emitter of transistor 322 are connected to line 316 by means of resistors 326 and 327, respectively. The emitters of transistors 315 and 320 are connected directly to ground. Similarly, the emitter of transistor 318 and the base of transistor 315 are connected to ground by means of resistor 328. In addition, the base of transistor 320 is also connected to ground by means of resistor 329. Other ground connections include resistor 330, which is connected to the collector of transistor 322, resistor 331, which is connected to the collector of transistor 323, and resistor 332 and variable resistor 335 which are connected in series to the base of transistor 322.

The circuit to the vacuum plenum flip flop and air jet mono is completed when level 201 of switch 200 reaches position 5. This permits circuit 216 to alternately energize valves 291 and 292, and to activate air jet trigger 313 to energize the air jet mono circuit 217, thus effectuating the extraction of the leader tape from a cassette in a loading position and the placement thereof on the splicing block.

Figure 14:
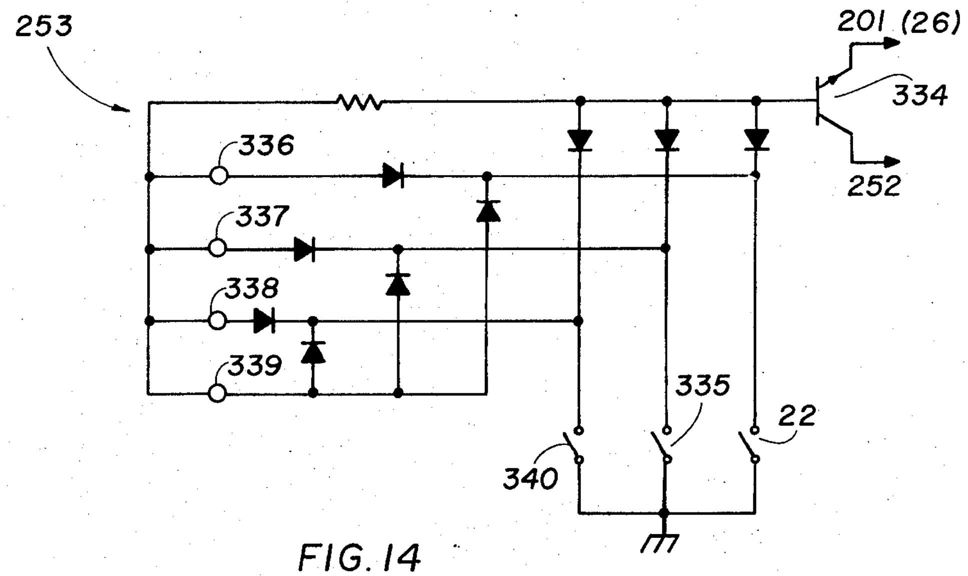
FIG. 14 is a schematic drawing of the out-of-materials gate used in the apparatus.

The out-of materials gate 253 is shown in FIG. 14. This circuit comprises an NPN transistor 334, having its collector connected to timer 252 and its emitter connected to terminal 26 of stepper level 201. The base of transistor 333 is connected in parallel to switches 22, which is actuated upon the depletion of a predetermined number of cassettes in magazine 11, switch 335, which operates in conjunction with lever arm 184 to indicate when the amount of supply tape on reel 8 has reached a predetermined minimum, and microswitch 340 which is located in the splicing tape path and actuated by the depletion of said tape. Also included in circuit 253 are a series of signal lights 336, 337 and 338 which indicate that cassettes, magnetic tape and splicing tape, respectively, require replenishment. A reload signal light 339 is also provided to operate in conjunction with each of the foregoing signal lights. If any one of switches 22, 335 or 340 is closed during the loading operation of any cassette, the circuit between terminal 26 of stepper level 201 and timer 252 will be broken and the winding apparatus of the invention will automatically stop in position 26 of the stepper switches. Furthermore, the deficient supply must be replenished before the apparatus can again be started.

The electronic circuitry required for the drive speed control circuit, the hot wire monostable circuit and the motion sense circuit is similar to the circuitry described hereinabove and can be readily designed and constructed by those skilled in the art with reference to the particular functions of these circuits. Accordingly, the particular details of these circuits will not be described herein.

To institute the operation of the apparatus of the invention, the operator first loads the machine with a suitable reel of prerecorded or blank recording tape 3, a plurality of cassettes 12, and a reel of splicing tape 106. The supply tape is threaded around the guide rollers shown in FIG. 1 and placed within groove 100 of splicing block section 97. Similarly, splicing tape 106 is threaded around guide roller 114 of the splicing assembly 73 and placed within groove 115 of holding block 110 with its leading end overhanging the edge of the block. The automatic circuitry shown in FIG. 11 is then actuated by the operator so that each cassette is sequentially loaded with the appropriate amount of supply tape, and ejected from the apparatus upon completion of the loading apparatus, all automatically.

Upon start up, all levels of the stepper switch are moved in unison into position number 1. Microswitch 21, located at the bottom of magazine 11, indicates the orientation of the bottom most cassette in the magazine, and thereby determines which of the switches 42 or 43 of the Geneva index logic will be in the circuit. The actuation of switch 21 energizes Geneva drive motor 33 to commence rotational movement of the Geneva drive so as to place receiver 15 in the proper position for the receipt of a cassette from the magazine. When the Geneva reaches the proper position microswitch 42 or 43, depending upon which is in the circuit, is actuated and the stepper switches are advanced to the next position.

The cassette feed means 26 is then actuated by solenoid 213 to discharge the lowermost cassette from magazine 11 and insert the same into receiver 15. The insertion of the cassette into receiver 15 compresses spring 47 of the cassette indexing means 36, which in turn actuates microswitch 44 to advance stepper switch 200 to the next position, in which motor 33 is again energized to rotate receiver 15 into the tape loading position. Once in the tape loading position, microswitch 49 is actuated by the Geneva drive mechanism, the cassette feed means is retracted and the stepper switch is advanced to effectuate the next operation. It should be noted that at startup the drive motor transport limit cylinder 189 is in its extended obstructing position to stop by means of lug 172 the inward movement of drive motor transport 80 in the intermediate or leader tape extracting position. Accordingly, in position 4 of the stepper switch 200, the energization of solenoid 215 actuates drive motor transport cylinder 187 to advance the transport means 80 merely into its leader extracting position. In this position, microswitch 214 is actuated and the stepper is advanced to position number 5.

In position 5, the vacuum plenum flip-flop circuit 216 and the air jet mono circuit 217 are actuated to extract the leader 7 from the cassette in the loading position and position the same for cutting within grooves 98 and 99 of splicing block 70. Switch 218, which is a flow sensitive switch located in vacuum lines 87 and 88 connected to plenum housing 72, is actuated upon the obstruction by the leader tape of the plenum outlet ports, to advance the stepper switch to the next position.

In position 6, solenoid 233 controlling vacuum lines 139 and 140 connected to grooves 98, 99 and 100 of splicing block 70 is actuated to hold the leader tape and the leading section of supply tape in its proper position upon splicing block 70. In addition, solenoid 215 is also energized to retract drive motor transport means 80 from its leader tape extracting position. Simultaneously with this operation, splicing assembly 73 commences its independent splicing tape feed cycle in which tape 106 is automatically fed via holding block 110 from reel 105 to splicing foot 113, and solenoid 221 is energized to actuate splicing block lift cylinders 92 and 93 to lower the splicing block into its splicing position.

Microswitch 222 is actuated to advance the stepper switch to the next position when the splicing block 70 reaches its lowermost position. In position 7 of stepper switch 200, splicing assembly transport cylinder 159 is actuated to move the entire splicing assembly 73 into position for splicing the leader tape and the supply upon the splicing block. In addition transport limit cylinder 189 is actuated to raise stop lug 172 out of its obstructing position. Concurrently with these operations, guide roller 185 located in the tape path between housing 71 and splicing block 70 is moved into its operative position, and guide roller 131 located at the entrance passage of housing 71 is likewise moved into a tape guiding position. Stepper switch 200 is advanced to the next position upon the actuation of microswitches 227 by splicing tape holding block 110 when it is returned to its tape receiving position, and microswitch 228 by the splicing assembly 73 when it reaches the splicing position.

In position 8, the stepper switch energizes solenoid 229 to activate the splicing foot cylinder 155 to raise splicing foot 113 into a position for cutting the splicing tape. In addition, line 148 controlling the vacuum to groove 145 of splicing foot 113 is also actuated to hold a portion of the splicing tape within groove 145. Simultaneously with this operation, hot wire mono circuit 231 is energized to heat the hot wire to the proper cutting temperature and hot wire lift cylinder 166 is actuated to move the hot wire through its first cutting cycle, in which the leader tape positioned on splicing block 70 within grooves 98 and 99 is cut and the leading edge of the splicing tape held by splicing foot 113 and holding block 110 is likewise cut. At the end of this initial cutting operation, the hot wire remains in its "up" position, so that it may be subsequently lowered to its starting position to effectuate a further cutting operation, as hereinafter described. As the hot wire cuts the leader tape and the splicing tape, solenoid 215 of the drive motor transport cylinder 187 is also actuated to advance the drive motor transport 80 into the drive position, in which stub axle 76 of drive motor 75 operatively engages spool 4 of the cassette held in receiver 15. Microswitch 232 is actuated by cutting means 160 after the initial cutting operation to energize the stepper relay to advance stepper switch 200 to its next position.

In position 9, solenoid 234 of the splicing block shift cylinder 101 is actuated to move splicing block section 97 from its first position in which guide grooves 98 and 99 are in alignment to its second position in which grooves 98 and 100 are in alignment. This operation places the trailing end of the leading section of the cut leader tape held within guide groove 98 in abutting alignment with the leading end of the supply tape held within guide groove 100 of splicing block section 97. In addition, the splicing foot lift cylinder 155 is deactuated to lower splicing foot 113 into a position for splicing. Microswitch 235 is actuated by splicing block section 97 as it is moved into the second position to advance the stepper switch to position 10.

Splicing head cylinder 122 is next actuated by means of solenoid 236 to splice the trailing end of the leader tape to the leading end of the supply tape. Actuation of cylinder 122 lowers the entire splicing head assembly 108 in a manner such that splicing foot 113 initially applies the splicing tape under pressure to the sections of tape to be spliced. Continued application of pressure by cylinder 122 causes compression of spring 150, thus lowering rubber pressure pad 125 into contact with the splicing tape overhanging the end of the foot 113 to complete the splicing operation. Simultaneously, with the application of the splicing tape to the supply tape and the leader tape held on the splicing block, the vacuum in line 148 is automatically cut off to release the splicing tape from groove 145 of foot 113. At the same time electronic tape counter 350 is reset to zero. Microswitch 238 is actuated by the splicing head assembly 108 when it is moved into contact with the splicing block upon actuation of cylinder 122, and thereby advances stepper switch 200 to its next position.

In position 11 of switch 200, splicing head cylinder 122 is retracted, the vacuum in lines 139 and 140 connected to splicing block 70 is shut off, tape clamp cylinder 144 is actuated to release clamping means 141 from the supply tape, and cassette drive motor 75 is started by drive speed control circuit 239. If prerecorded programs are contained on tape 3 being loaded into the cassette, switch 241 is placed in its open position so that transducers 78 and 77 via their appropriate amplifying circuits control the next sequence of operations of the winding apparatus of the invention. As mentioned before, an inaudible pulse is recorded in the beginning of each tape program, and is picked up by transducer 78. The amplified signal from transducer 78 actuates stepper mono 210 to advance the stepper switches to the next position.

In position 12, tensioning motor 242 is actuated to provide a reverse torque to the supply reel hub 13 and thereby stop the advancement of the supply tape, and the circuit to the drive speed control circuit 239 is opened, thereby stopping drive motor 75. When the tape has come to a complete stop tape counter 181 actuates motion sense circuit 243 to provide a signal which advances stepper switch 200 to the next position. The supply brake is then released, full power is applied to drive motor 75 via drive speed control 239 and the independent splicing tape feed cycle is again commenced. Near the end of each tape program another high frequency inaudible pulse is provided. When this pulse is picked up by transducer 77, stepper switch 200 is advanced to the next position, in which the drive motor is deactivated and the supply brake reactivated to stop the advancement of supply tape. Again, when the tape comes to a complete rest, tape counter 181 provides a signal to motion sense circuit 243, which in turn advances the stepper to the next switch position.

In position 15, splicing foot lift cylinder 155 is again actuated by solenoid 229 to raise splicing foot 113 into the splicing tape cutting position. Timers 244 and 245 then control the operation of the device to, respectively, retract guide roller 131 from the tape path, and activate vacuum lines 139 and 140 of the splicing block 70 to hold the supply tape within grooves 99 and 100 of the splicing block by suction. Switch 246 is a flow sensitive switch which is actuated upon a predetermined decrease in the vacuum flow of lines 139 and 140 effectuated by the obstruction of passages 94 in guide grooves 98 and 100 of the splicing block 70 by the supply tape. Actuation of switch 246 advances the stepper switch 200 to the next position.

In position 16, pneumatic cylinder 166 is actuated by solenoid 230 to pivotally move cutting means 160 from its "up" position to its "down" position located below the surface of splicing block 70, simultaneously with the heating of the hot wire to the appropriate cutting temperature by hot wire mono circuit 231, so as to sever the next section of splicing tape and to cut the supply tape at the end of the pre-recorded program. At the same time the flow in vacuum line 111 of splicing tape holding block 110 is recommenced to secure the next section of splicing tape within groove 115. The return of the cutting means 160 to its "down" position actuates microswitch 247 to advance the stepper switch 200 to the next position, in which splicing block section 97 is shifted by cylinder 101 into its first position to realign tape guide grooves 99 and 98. In this manner the trailing end of the supply tape held within groove 98 is moved into abutting alignment with the leading end of the remaining leader tape section held within groove 99. Concurrently with this operation, splicing foot lift cylinder 155 is retracted to permit spring 150 of the splicing head assembly 108 to return splicing foot 113 to its original position. Microswitch 235 detects the shifting of splicing block section 97 and in response thereto advances stepper switch 200 to position 18.

In position 18, splicing head cylinder 122 is actuated to apply the section of splicing tape held within guide groove 145 of splicing foot 113 to the abutting sections of supply tape and leader tape held within the guide grooves of splicing block 70. As in the prior splicing operation, simultaneously with the application of the splicing block to the tape held in splicing block 70, the vacuum flow in line 148 is shut to release the splicing tape. Microswitch 238 is actuated by splicing head assembly 108 as it reaches the bottom of its splicing stroke to advance the stepper switch to the next position in which guide roller 185 is retracted, and splicing head cylinder 122 is likewise retracted. The retraction of splicing head cylinder 122, in turn, actuates microswitch 249 to advance stepper switch 200 to position number 20. In this position of the stepper switch, the low speed portion of drive control circuit 239 is actuated to advance drive motor 75 at a relatively low speed to take up within the cassette the remaining portion of supply tape and leader tape, thereby completing the winding operation. Simultaneously with the actuation of the drive motor to low power, vacuum lines 139 and 140 connected to the splicing block 70 are deactivated to release the tape from the guide grooves of the splicing block, and splicing assembly transport cylinder 159 is actuated by solenoid 224 to retract the splicing assembly to its starting position.

Microswitch 250 is actuated by the splicing assembly 73 as it is returned to its starting position to advance stepper switch 200 to position number 21. In this position, drive motor transport 80 is retracted to its non-operative position by the actuation of drive motor transport cylinder 86 and the cassette drive motor is deactivated. The return of the drive motor transport 80 to its non-operative position actuates microswitch 214 to advance the stepper to the next position. At this point Geneva drive motor 33 is actuated to rotate receiver 15 to the eject position, in which microswitch 42 is actuated to once again advance stepper switch 200. Finally, in position 23 the cassette eject cylinder 176 is actuated by solenoid 251 to eject the finished cassette from receiver 15. Concurrently with this operation, to prepare for the next cassette, the transport limit cylinder 189 is actuated to lower stop lug 172 into its obstructing position, and the splicing block 70 is raised by cylinder 92 and 93 into engagement with the bottom of vacuum plenum 72 to be in position to receive the leader tape from the next cassette. Microswitch 222, which advances the stepper to the next position, is actuated by the splicing block when it is raised into its leader tape receiving position. At this point, timer 252 controls the device to sequentially advance stepper switch 200 to position 1 to recommence the loading operation with the next cassette in magazine 11.

It should be noted that a plurality of manually operable switches can be provided on control panel 10 to advance stepper switch 200 through each step to monitor the operation of the winding apparatus. In addition, as noted hereinbefore, actuation of the clear circuit at any point during the winding operation automatically advances the stepper switch to position 26, resets each function, and stops the operation of the device. This is useful at any point where it appears to the operator that the tape is either broken or has twisted during the winding operation. Similarly, the out of material gate, as described hereinabove, is operable to stop the apparatus in stepper switch position 26, if at any point during the preceding cutting, splicing and winding operation either the magnetic tape, the splicing tape or the number of cassettes are depleted to a predetermined minimum quantity.

It will be understood to those skilled in the art that the embodiments described hereinabove are included for illustrative purposes only and in no way limit the invention. As will be apparent there are numerous modifications that can be made to the various mechanical and electrical components which comprise the winding apparatus of the invention, and which will fall within the scope of the invention. For example, the apparatus of the invention can be readily adapted for use with tape on film of any type, such as video tape and photographic film. In addition, with slight modification the instant apparatus can be adapted to load single reel tape or film cassettes or cartridges, including but not limited to those of the endless loop type.

What we claimed is:

1. An apparatus for automatically loading a plurality of cassettes of the type having at least one rotatable spool and a leader attached to said spool with a predetermined length of tape or the like comprising, in combination, a loading station, means for storing a plurality of cassettes to be loaded; means for advancing said cassettes, one at a time, from said storing means to said loading station; means for extracting the leader from each cassette in the loading station; means for holding a supply of tape to be loaded; splicing means for joining the leading end of said tape to the trailing end of said leader; rotatable drive means for rotating the spool of each cassette to wind a predetermined length of said tape therein; cutting means to sever the tape upon completion of the winding operation; means for ejecting each loaded cassette from the apparatus; and control means to sequentially and cyclically activate and deactivate the foregoing means to effectuate the continuous loading of a plurality of cassettes.

2. An apparatus in accordance with claim 1, in which the means for storing the cassettes comprises a vertically disposed hopper adapted to hold a stack of cassettes, one upon the other.

3. An apparatus in accordance with claim 1, in which the loading station comprises cassette receiving means adapted to sequentially receive each cassette advanced from the storing means to hold the same in a tape loading position.

4. An apparatus in accordance with claim 3, in which the cassette receiving means comprises a pair of parallel spaced apart plates rigidly secured to each other along one or more edges, and having at least one open edge through which the cassettes may be inserted; abuttment means interposed between the plates for aligning the cassettes inserted therein; and biasing means secured to at least one of said plates and adapted to urge each cassette firmly against the other of the two plates.

5. An apparatus in accordance with claim 3, in which the cassette receiving means is rotatably disposed; and indexing means are provided to rotate the receiving means between a cassette receiving position adjacent the cassette storing means to receive the next cassette, a tape loading position in which the leader is extracted, cut, spliced to the tape and the tape wound upon said spool, and a cassette eject position, in which loaded cassettes are discharged from the receiving means.

6. An apparatus in accordance with claim 5, in which the indexing means comprises an electric motor operatively connected to said receiving means; sensing means responsive to the position of the next cassette to be loaded in the storing means to sequentially energize said motor to first rotate the receiving means in the proper direction to receive such cassette, and then rotate the receiving means in the proper direction to place such cassette in the loading position.

7. An apparatus in accordance with claim 6, further comprising a Geneva drive mechanism to operatively link the motor and the receiving means.

8. An apparatus in accordance with claim 1, in which the means for extracting the leader from a cassette in the loading station comprises a tubular member having a nozzle at one end and connected at the other end to a source of high pressure air; said member being adapted to engage a locating opening formed in the cassette, so as to position the nozzle to direct a jet of high pressure air against a surface of the leader to force the same out of an opening formed along an edge of the cassette.

9. An apparatus in accordance with claim 1, said splicing means further including a splicing block comprising a first section having a first guide means for alternately receiving lengths of leader and supply tape, and a second section disposed adjacent the first section having second guide means for receiving a section of leader and third guide means for receiving a length of supply tape; at least one of said splicing block sections being movable between a first position in which the first guide means is in alignment with the second guide means, and a second position in which the first guide means is in alignment with the third guide means.

10. An apparatus in accordance with claim 9, said splicing means further comprising means for positioning the leader within the first and second guide means of the splicing block.

11. An apparatus in accordance with claim 10, in which the means for positioning the leader within the guide means of the splicing block comprises a housing having an elongated internal chamber, an entrance passage for said chamber located adjacent the cassette loading station to permit the entry of the leader into said chamber upon its extraction from a cassette, at least one outlet port communicating said chamber with a vacuum source to create a suction force to act upon the leader in a manner such that the leader forms a loop conforming in shape to the internal configuration of the chamber.

12. An apparatus in accordance with claim 11, in which the housing is open along its bottom surface to expose the internal chamber, and the splicing block is movable between a leader receiving position in which the splicing block sealably engages the bottom of said housing to enclose the chamber and receive a section of the leader loop within the first and second guide means thereof, and a cutting and splicing position vertically spaced apart from said housing.

13. An apparatus in accordance with claim 11, in which an outlet port connected to said vacuum source is disposed at each end of the housing in communication with the internal chamber; and means are provided to alternately apply suction via said vacuum source to each of said ports.

14. An apparatus in accordance with claim 10, in which the means for positioning the leader within the guide means of the splicing block comprising a housing having an elongated internal chamber, an entrance passage for said chamber located adjacent the cassette loading position to permit the entry of the leader into said chamber upon its extraction from a cassette, and at least one outlet port communicating said chamber and a vacuum source to create a suction force to act upon the leader in a manner such that the leader forms a loop conforming in shape to the internal configuration of the chamber.

15. An apparatus in accordance with claim 14, in which the housing is open along its bottom surface to expose the internal chamber and the splicing block is movable between a leader receiving position in which the splicing block sealably engages the bottom of said housing to enclose the chamber and receive a section of the leader loop within the first and second guide means, and a cutting and splicing position vertically spaced apart from said housing.

16. An apparatus in accordance with claim 15, in which an outlet port connected to said vacuum source is disposed at each end of the housing in communication with the internal chamber; and means are provided to alternately apply suction via said vacuum source to each of said ports.

17. An apparatus in accordance with claim 9, in which the first guide means in the first section of the splicing block comprises an elongated groove having a width slightly larger than the width of the supply tape and the leader to alternately receive and hold such tape and such leader therein; and the second and third guide means in the second splicing block section comprises two spaced apart parallel elongated grooves, which are selectively alignable with the groove of the first guide means to define the first and second splicing block positions.

18. An apparatus in accordance with the claim 9, in which vacuum lines are provided to communicate with the guide means in the splicing block to hold the leader and supply tape therein by means of suction.

19. An apparatus in accordance with claim 1, in which the cutting means comprises an electrical resistance type heating element adapted to sever the tape by rapidly burning the same along a narrow line.

20. An apparatus in accordance with claim 9, in which the cutting means comprises an electrical resistance type heating element mounted on a pivotally movable lever arm, which arm is adapted to raise and lower said heating element between a position below the surface of the splicing block and a position above the surface of the splicing block, to cut the leader positioned within the first and second guide means during its upward movement, and to cut the supply tape positioned within the first and third guide means during its downward movement.

21. An apparatus in accordance with claim 1, in which the splicing means comprises a splicing block to support a section of the leader and a section of supply tape in abutting juxtaposition; means for supporting a role of adhesive splicing tape; a splicing tape applicator; and reciprocally movable feed means for incrementally advancing the splicing tape from the supply role to the splicing tape applicator; said applicator being reciprocal for receiprocial vertical movement above the splicing block to apply a section of splicing tape under pressure to the abutting ends of the leader and supply tape on the splicing block.

22. An apparatus in accordance with claim 21, in which the cutting means is further adapted to cut a section of splicing tape supported by the splicing means.

23. An apparatus in accordance with claim 1, in which the rotatable drive means for the spool of each cassette comprises a drive motor having a stub axle adapted to selectively engage said spool; and transport means for supporting said drive motor, reciprocally movable between a drive position in which the stub axle operatively engages said spool, and a neutral position in which the stub axle is out of such engagement.

24. An apparatus in accordance with claim 1, further comprising sensing means responsive to the amount of supply tape being wound into each cassette to deactivate the drive means after a predetermined amount of said tape has been so wound.

25. An apparatus in accordance with claim 24, in which the sensing means comprises at least one magnetic tape transducer adapted to pick up high frequency signals recorded on the tape a predetermined intervals.

26. An apparatus in accordance with claim 24, in which the sensing means comprises a mechanical tape counter adapted to measure the length of tape actually being wound into each cassette and to provide a signal when such predetermined amount of tape has been loaded.

27. An apparatus in accordance with claim 1, in which the means for ejecting a loaded cassette comprises a reciprocally movable pusher arm adapted to engage the edge of a cassette held in the loading station to forceably urge the same therefrom.

28. An apparatus in accordance with claim 1, in which the control means comprises at least one multiposition relay operated stepper switch adapted to sequentially actuate each of the means of the apparatus.

29. An apparatus for automatically loading a plurality of cassettes of the type having two rotatable spools and a leader tape connecting said spool with a predetermined length of magnetic tape or the like from a supply reel comprising, in combination, a magazine for storing a supply of empty cassettes to be loaded; cassette receiving means adapted to removably receive one of such cassette at a time and hold the same in a tape loading position; feed means for sequentially transporting each cassette from said magazine to said cassette receiving means; a spindle for rotatably supporting a reel of supply tape; a splicing block comprising a first section having a first guide means for alternately receiving lengths of leader tape and supply tape, and a second section disposed adjacent the first section having second guide means for receiving a section of leader tape and third guide means for receiving a length of supply tape, at least one of said splicing block sections being movable between a first position in which the first guide means is in alignment with the second guide means and a second position in which the first guide is in alignment with the third guide means; means for extracting the leader tape from each cassette placed in the tape loading position; means for positioning the leader tape within the first and second guide means of the splicing block in its first position; means for cutting the supply tape and the leader tape positioned on the splicing block, said means being movable between a first cutting position in the first position of the splicing block to cut the leader tape into two sections, and a second cutting position in the second position of the splicing block to cut the supply tape after a predetermined amount thereof has been wound into each cassette; splicing means disposed adjacent said splicing block to splice the trailing end of the leader tape section in the first guide means to the leading end of the supply tape in the third guide means in the second position of the splicing block, and to splice the trailing end of the supply tape to the leading end of the leader tape section held in the second guide means in the first position of the splicing block; rotatable drive means adapted to operatively engage at least one spool of each cassette held in the loading position to wind the supply tape into said cassette after the same has been spliced to said leader tape; sensing means responsive to the amount of supply tape being wound into each cassette to deactivate the drive means after a predetermined amount of said tape has been so wound; means for ejecting each cassette from the cassette receiving means after such cassette has been loaded with the desired amount of supply tape; and control means adapted to sequentially and cyclically activate and deactivate the foregoing means of the apparatus to effectuate the continuous loading of a plurality of cassettes.

30. An apparatus in accordance with claim 29, in which the magazine comprises a vertically disposed hopper adapted to hold a stack of cassettes, one upon the other.

31. An apparatus in accordance with claim 29, in which the cassette receiving means comprises a pair of parallel spaced apart plates rigidly secured to each other along one or more edges, and having at least one open edge through which the cassettes may be inserted; abuttment means interposed between the plates for aligning the cassettes inserted therein; and biasing means secured to at least one of said plates and adapted to urge each cassette firmly against the other of the two plates.

32. An apparatus in accordance with claim 29, in which the cassette receiving means is rotatably disposed and indexing means are provided to rotate the receiver means between a cassette receiving position adjacent the cassette magazine to receive the next cassette, a tape loading position in which the leader is extracted, cut, spliced to the supply tape and the supply tape wound upon said spool, and a cassette eject position, in which loaded cassettes are discharged from the receiving means.

33. An apparatus in accordance with claim 32, in which the indexing means comprises an electric motor operatively connected to said receiving means; sensing means responsive to the position of the lower most cassette in the magazine to sequentially energize said motor to first rotate the receiving means in the proper direction to receive such cassette, and then rotate the receiving means in the proper direction to place such cassette in the loading position.

34. An apparatus in accordance with claim 33, further comprising a Geneva drive mechanism to operatively link the motor and the receiving means.

35. An apparatus in accordance with claim 29, in which the means for extracting the leader from a cassette in the loading station comprises a tubular member having a nozzle at one end, and connected at the other end to a source of high pressure air; said member being adapted to engage a locating opening formed in the cassette, so as to position the nozzle to direct a jet of high pressure air against a surface of the leader to force the same out of an opening formed along an edge of the cassette.

36. An apparatus in accordance with claim 29, in which the first guide means in the first section of the splicing block comprises an elongated groove having a width slightly larger than the width of the supply tape and the leader to alternately receive and hold such tape and such leader therein and the second and third guide means in the second splicing block section comprises two spaced apart parallel elongated grooves, which are selectively alignable with the groove of the first guide means to define the first and second splicing block positions.

37. An apparatus in accordance with the claim 29, in which vacuum lines are provided to communicate with the guide means in the splicing block to hold the leader and supply tape therein by means of suction.

38. An apparatus in accordance with claim 29, in which the cutting means comprises an electrical resistance type heating element adapted to sever the tape by rapidly burning the same along a narrow line.

39. An apparatus in accordance with claim 38, in which the cutting means comprises a pivotalling movable lever arm mounting said electrical resistance type heating element thereon and adapted to raise and lower said heating element between a position below the surface of the splicing block and a position above the surface of the splicing block to cut the leader positioned within the first and second guide means during its upward movement, and the supply tape positioned within the first and third guide means during its downward movement.

40. An apparatus in accordance with claim 29, in which the splicing means comprises means for supporting a role of adhesive splicing tape; a splicing tape applicator, and reciprocally movable feed means for incrementally advancing the splicing tape from the supply role to the splicing tape applicator; and applicator being disposed for reciprocal vertical movement above the splicing block to apply a section of splicing tape under pressure to the ends of the leader and supply tape on the splicing block.

41. An apparatus in accordance with claim 40, in which the cutting means is further adapted to cut a section of splicing tape supported by the splicing means.

42. An apparatus in accordance with claim 29, in which the rotatable drive means for the spool of each cassette comprises a drive motor having a stub axle adapted to selectively engage said spool; and transport means for supporting said drive motor reciprocally movable between a drive position, in which the stub axle operatively engages said spool, and a neutral position, in which the stub axle is out of such engagement.

43. An apparatus in accordance with claim 29, in which the sensing means comprises at least one magnetic tape transducer adapted to pick up high frequency signals recorded on the tape at predetermined intervals.

44. An apparatus in accordance with claim 29, in which the sensing means comprises a mechanical tape counter adapted to measure the length of tape actually being wound into each cassette and to provide a signal when such predetermined amount of tape has been loaded.

45. An apparatus in accordance with claim 29, in which the means for ejecting a loaded cassette comprises a reciprocally movable pusher arm adapted to engage the edge of a cassette held in the cassette receiving means to forceably urge the same therefrom.

46. An apparatus in accordance with claim 29, in which the control means comprises at least one multi-position relay operated stepper switch adapted to sequentially actuate each of the means of the apparatus.

* * * * *